United States Patent
Balmakhtar et al.

(10) Patent No.: US 12,513,522 B2
(45) Date of Patent: Dec. 30, 2025

(54) SYSTEMS AND METHODS FOR LEDGER-BASED COOKIE MANAGEMENT

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 173 days.

(21) Appl. No.: 18/467,329

(22) Filed: Sep. 14, 2023

(65) Prior Publication Data

US 2025/0097707 A1    Mar. 20, 2025

(51) Int. Cl.
  *H04L 9/40*  (2022.01)
  *H04W 12/02*  (2009.01)
  *H04W 12/084*  (2021.01)

(52) U.S. Cl.
  CPC ......... *H04W 12/084* (2021.01); *H04W 12/02* (2013.01)

(58) Field of Classification Search
  CPC .. H04W 12/084; H04W 12/02; H04L 9/3239; H04L 9/50; H04L 63/12; H04L 67/141; H04L 67/104; H04L 67/146; H04L 67/02
  See application file for complete search history.

(56) References Cited

U.S. PATENT DOCUMENTS

| | | | |
|---|---|---|---|
| 12,256,006 B1 * | 3/2025 | Bosch | H04L 67/133 |
| 2020/0028926 A1 * | 1/2020 | Sprague | H04L 9/0877 |
| 2020/0117690 A1 * | 4/2020 | Tran | G06Q 20/18 |

(Continued)

FOREIGN PATENT DOCUMENTS

EP    4096157 A1 * 11/2022    ......... H04L 9/3213

OTHER PUBLICATIONS

Belfaik Yousra; Sadqi Yassine; Maleh Yassine; Safi Said; Tawalbeh Lo'ai; Khaled Salah "A Novel Secure and Privacy-Preserving Model for OpenID Connect Based on Blockchain"; IEEE Access; vol. 11; Journal Article; Year: Jul. 2023; pp. 67660-67678 (Year: 2023).*

(Continued)

*Primary Examiner* — Fatoumata Traore
*Assistant Examiner* — Courtney D Fields
(74) *Attorney, Agent, or Firm* — Shook, Hardy & Bacon L.L.P.

(57) ABSTRACT

In various embodiments, systems and methods for ledger-based cookie management are provided. Rather than store cookie data as text files on the local device drive, cookie data is recorded to a blockchain technology cookie ledger store on a network resource. When a client application (e.g., a browser) on the UE is directed to a cloud-based service, and that cloud-based service calls for access to a cookie, that call is processed by a cookie gateway executing on the UE. The cookie gateway may verify authenticity of the user and generate a cookie access token that it transmits to the cloud-based service. The cloud-based service may use the cookie access token to locate the cookie ledger and access one or more records storing cookie data used by the cloud-based service. The cookie access token may expire upon termination of the session between the user equipment and the cloud-based service.

19 Claims, 12 Drawing Sheets

(56) References Cited

U.S. PATENT DOCUMENTS

2022/0377060 A1 11/2022 Livny et al.
2024/0185191 A1* 6/2024 Bernardi .................. H04L 9/50

OTHER PUBLICATIONS

Extended European Search Report received for European Application No. 24200339.0, mailed on Jan. 29, 2025, 14 pages.
Ezawa et al., "Designing Authentication and Authorization System with Blockchain", 14th Asia Joint Conference on Information Security, 2019, pp. 111-118.
Tan et al., "Survey on Digital Sovereignty and Identity: From Digitization to Digitalization," ACM Comput. Surv. 56, 3, Article 61 (Oct. 2023), 36 pages. https://doi.org/10.1145/3616400, 36 pages.
Agung, A., A., G., and Handayani, R., "Blockchain for smart grid", Journal of King Saud University—Computer and Information Sciences, vol. 34, pp. 666-675 (2022).
"10 examples of smart contracts on blockchain", Tech Target, Retrieved from Internet URL : http://www.techtarget.com/searchcio/feature/Examples-of-smart-contracts-on-blockchain, accessed on Aug. 20, 2023, pp. 5 (Sep. 12, 2022).
"Cookies are dead! Long live web3!", VETRI, Retrieved from Internet URL : http://vetri.global/cookies-are-dead-long-live-web3/, accessed on Aug. 22, 2023, pp. 7.
Canals, P., "Google Topics: What It Is and How It Will Work in Cookie-Free Advertising", Data Science, Cyberclick, Retrieved from Internet URL : https://www.cyberclick.net/numericalblogen/google-topics-what-it-is-and-how-it-will-work-in-cookie-free-advertising, accessed on Aug. 22, 2023, pp. 10 (May 3, 2022).
"Can Dapps set cookies", Ethereum Stack Exchange, Retrieved from Internet URL : https://ethereum.stackexchange.com/questions/73266/can-dapps-set-cookies, accessed on Aug. 20, 2023, pp. 2.
Moreland, K., "What Is a dApp? Decentralized Apps Explained", Ledger, Retrieved from Internet URL : https://www.ledger.com/academy/what-is-a-dapp, accessed on Aug. 20, 2023, pp. 8.
Vasin, S., "When The Cookie Crumbles: How Businesses And End-Users Can Unlock Web3's Potential", Forbes Innovation, Retrieved from Internet URL : https://www.forbes.com/sites/forbestechcouncil/2023/04/10/when-the-cookie-crumbles-how-businesses-and-end-users-can-unlock-web3s-potential/?s . . . , accessed on Aug. 22, 2023, pp. 6 (Apr. 10, 2023).
"Why Web3 Wallets Are The New 'Cookies' for Digital Marketers", Magic, Blogs, Retrieved from Internet URL : https://magic.link/posts/web3-wallets, accessed on Aug. 22, 2023, pp. 6 (Jul. 30, 2023).

* cited by examiner

SYSTEMS AND METHODS FOR LEDGER-BASED COOKIE MANAGEMENT

BACKGROUND

Internet cookies, also referred to as website cookies, are small data files that a website stores on a device that visits the website. When placed on the device, the internet cookies may be used by the website for various purposes, including remembering user preferences, storing login credentials, tracking website browsing activity, and providing personalized content such as advertising. Cookies can be persistent, meaning that they remain on a user's device and are accessed repeatedly over multiple sessions. Each time the user returns to the website to start a new session, the website may read from, or write to, the internet cookies on the device that are associated with that website's internet domain. While cookies themselves are harmless text files, the use, and misuse, of cookies are increasingly raising privacy concerns.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments described herein, at least in part, may be used to permit cloud-based services (e.g., websites) to obtain and store cookie data. Rather than store cookie data as text files on the local device drive, cookie data is instead recorded to a blockchain technology-based cookie ledger stored on a network resource (e.g., a network server hosted data store). When a client application (e.g., a browser) on the user's device (user equipment) is directed to a cloud-based service, and that cloud-based service calls for access to a cookie, that call is processed by a cookie gateway executing on the user's device. The cookie gateway may verify the authenticity of the user and then generate a cookie access token that it transmits to the cloud-based service. The cloud-based service may then use the cookie access token to locate the cookie ledger and access one or more records storing cookie data used by the cloud-based service. The cookie access token may expire upon termination of the session between the user equipment and the cloud-based service.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
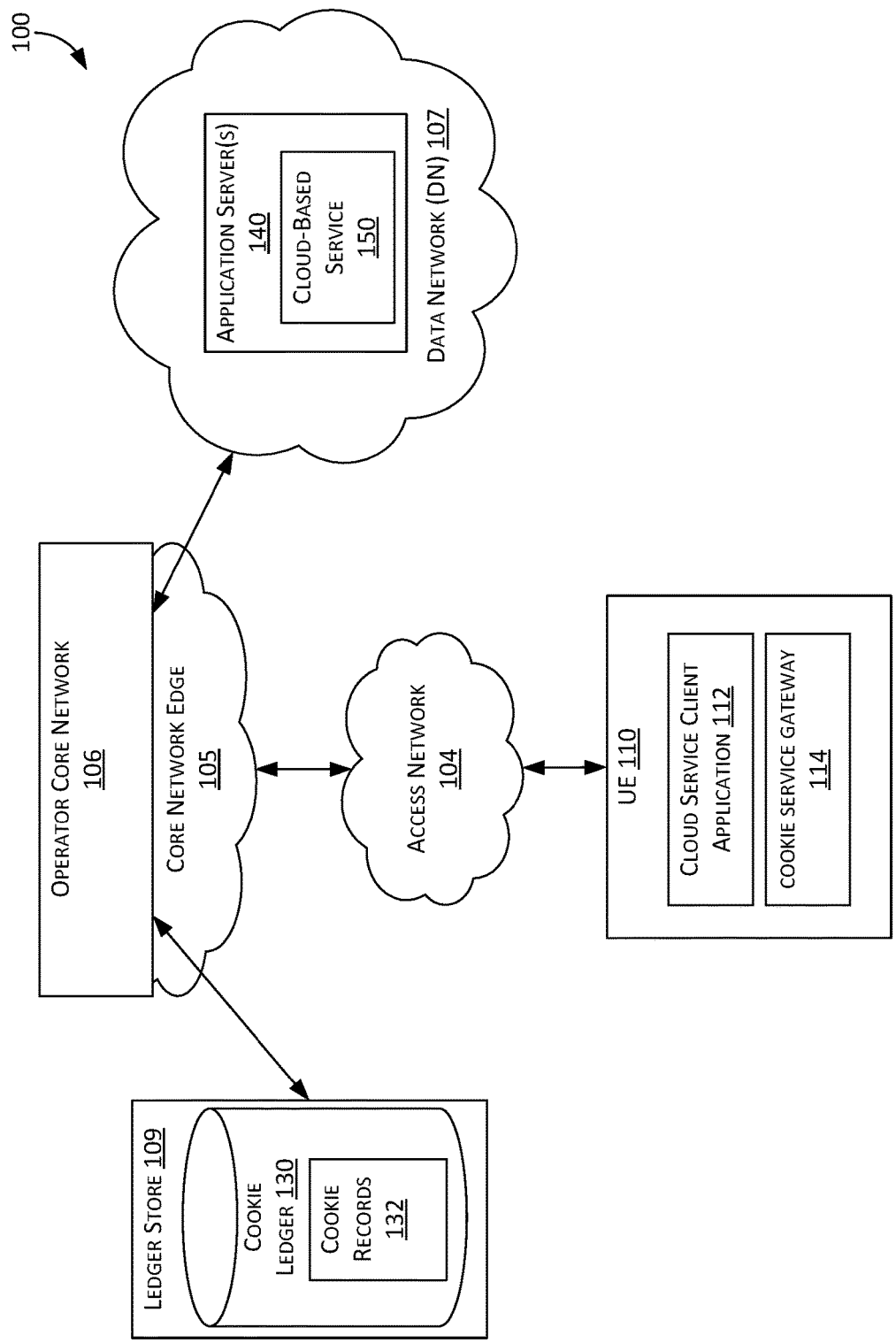
FIG. 1 is a diagram illustrating an example network environment for a telecommunications network, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more of the embodiments presented in the disclosure provide for, among other things, systems and methods for ledger-based cookie management where users retain ownership of their data. In today's internet, often referred to as the Web2 iteration of the internet, internet cookies are used by websites for various purposes including remembering user preferences, storing login credentials, tracking website browsing activity, and providing personalized content such as advertising. Internet cookies for numerous sites visited by a user are stored together locally on the user's device, and a single website may generate and utilize multiple internet cookies over a browsing session. While some internet cookies may enhance a user's experience by remembering preferences and/or provide conveniences such as remembering login credentials, other cookies may be used to track user activities across websites to create profiles of a user's online habits and activities. Moreover, since website login credentials often include a user's email address for purposes of user identification, that information may be exploited for malicious purposes such as cyberattacks based on exploiting cookie vulnerabilities. As an example, a hijacked cookie that contains a user's email address may be used to impersonate that user to obtain unauthorized access to online systems.

Web3 is an evolving philosophy and architecture for a next generation Internet network that leverages technologies such as blockchains, cryptocurrencies, smart contracts, and digital wallets to decentralize services and promote a user's ownership of their data to, among other things, enhance privacy. In principle, Web3 technologies support verifiable interactions between users and websites, while maintaining the user's ability to authenticate and own the data generated as a result of their online activities, and correspondingly to control who has access to their personal information and/or digital assets. Google Topics represents another emerging technology directed to addressing online privacy, in particular as a technology that replaces tracking cookies. With Topics, a browser keeps local (on-device) records of a user's browsing activity. From that data, algorithms select topics from a predefined set of topics that represent a user's most prevalent interests. The selected topics may then be shared with websites that can then deliver personalized content to the user of that browser without directly revealing the user's identity or specific browsing history. These solutions, however, force website providers to substantially restructure their existing algorithms to adopt these technologies and abandon much of the accumulated cookie-based knowledge currently used to efficiently serve cloud-based services on user devices.

In contrast to these technologies, one or more of the embodiments described herein may be used to permit cloud-based services (e.g., websites) to obtain and store cookie data (e.g., conventional cookie data) in a way that securely preserves user anonymity, as well as user ownership and control over the data. More specifically, in accordance with one or more embodiments, rather than store cookie data as text files on the local device drive, cookie data is instead recorded to a blockchain technology cookie ledger stored on a network resource (e.g., a network server hosted data store). When a client application (e.g., a browser) on the user's device is directed to a cloud-based service, and that cloud-based service calls for access to a cookie, that call is processed by a cookie gateway executing on the user's device. The cookie gateway may verify the authenticity of the user and then generate a cookie access token that it transmits to the cloud-based service. As explained in greater detail herein, the cloud-based service may then use the cookie access token to locate the cookie ledger and access one or more records storing cookie data used by the cloud-based service. In some embodiments, the cookie access token comprises a ledger reference identifier (ID) identifying records of the ledger storing the cookie data sought by the cloud-based service. The cookie access token may permit the cloud-based service to execute or otherwise interact with a smart contract recorded in the cookie ledger to access one or more sets of cookie data, where each set of cookie data is associated with a cookie name that the cloud-based service may use to refer to that set of cookie data. To update cookie data, or generate a new set of cookie data (e.g., under a new cookie name), the cloud-based service may use the cookie access token to execute a function of the smart contract to generate a new cookie ledger record and add the new cookie ledger record with the new or updated cookie data to the ledger. In some embodiments, the cloud-based service may comprise a decentralized application (DApp) that uses the cookie access token to interact with the cookie ledger and/or smart contracts. The cookie ledger thus becomes a cloud-based immutable repository of cookie data that is owned by the user rather than the cloud-based service. Cookie data may only be accessed by a cloud-based service receiving the cookie access token upon permission, and the cookie access token limits which smart contracts of the cookie ledger that the cloud-based service may access, and thus what sets of cookie data recorded on the cookie data the cloud-based service may access. The use of the reference ID to identify the relevant ledger to the cloud-based service can establish a separation between the recorded cookie data and the identity of the user and/or the device they are using, thus enhancing privacy. In some embodiments, the reference ID included in the cookie access token is generated by the cookie gateway using a decentralized identity technology and effectively functions to identify the cookie ledger that stores the cookie data of interest to the cloud-based service, rather than to distinctly identify the user.

Because the cookie data is maintained in a cloud-based ledger, it is not tied to any one browser application or device, but can instead provide the cloud-based service with a consistent cookie data even if the user accesses the cloud-based service from different devices (e.g., advantageously without the need to perform data synchronization between devices). In other words, the same set of cookie data may be accessed regardless of whether the user is working, for example, from a desktop computer, laptop, or from their mobile device. Moreover, at least some security risks are avoided by not maintaining cookie data in a persistent manner on the local device. For example, utilization of the cloud-based cookie ledger as described herein prevents the scenario of unauthorized use of a locally stored cookie by someone who might gain access to a user's device.

It should be noted that the cloud-based cookie ledger techniques do not limit the cookie data recorded to the ledger to any particular type of data content or format. The cloud-based cookies may replicate the functions of conventional session cookies, persistent cookies, third-party cookies, or whatever type of cookie data the smart contracts and/or DApps are programmed to support.

In some embodiments, the cookie ledger described herein may be accessible as a subscribed service of a telecommunications network and made available as a service to user equipment (UE) that connects through the telecommunications network to reach cloud-based services such as, but not limited to, websites. In such an embodiment, the UE may execute the cookie gateway, and the cookie access token produced by the cookie gateway may further be used by a DApp of the cloud-based services to obtain limited trusted access to services of the telecommunications network for purpose of accessing the cookie ledger identified by the cookie access token-provided reference ID—to support the current session between the UE and the cloud-based service. In some embodiments, the cookie access token may expire upon termination of the session between the UE and the cloud-based service. It should also be noted that UE in the contexts described herein may extend beyond user-operated computing devices to other devices that may autonomously connect to cloud-based services through the network, such as internet-of-things (IoT) devices, facility control systems, industrial machines, and the like.

As shown in FIG. 1, network environment 100 comprises an operator core network 106 (also referred to as a "core network") that provides one or more network services to one or more UEs 110 via at least one access network 104. In some embodiments, network environment 100 comprises, at least in part, a wireless communications network.

In some embodiments, the access network 104 comprises one or more radio access networks (RANs). A RAN is often referred to as a base station, cell site, or cellular base station. The RAN may implement wireless connectivity using, for example, 3GPP technologies. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intranet comprising one or more wireless access points (APs) such as, but not limited to, IEEE 802.11 (WiFi), and/or IEEE 802.15 (Bluetooth) access points.

The access network 104 may comprise a multimodal network (for example, comprising one or more multimodal access devices) where multiple radios supporting different systems are integrated into the access network 104. Such a multimodal access network 104 may support a combination of 3GPP radio technologies (e.g., 4G, 5G, and/or 6G) and/or non-3GPP radio technologies. In some embodiments, the access network 104 may comprise a terrestrial wireless communications base station and/or may be at least in part implemented as a space-based access network (e.g., comprising a space-based wireless communications base station).

In particular, individual UE 110 may communicate with the operator core network 106 via the access network 104 over one or both of uplink (UL) radio frequency (RF) signals and downlink (DL) radio frequency (RF) signals and/or via wired network connections. The access network 104 may be coupled to the operator core network 106 via a core network edge 105 that comprises wired and/or wireless network connections that may themselves include wireless relays and/or repeaters. In some embodiments, the access network 104 is coupled to the operator core network 106 at least in part by a backhaul network, such as the internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to, access network 104, the internet, or other third-party networks.

It should be understood that in some aspects, the network environment 100 may not comprise a distinct operator core network 106, but rather may implement one or more features of the operator core network 106 within other portions of the network, or may not implement them at all, depending on various carrier preferences. Moreover, the embodiments described herein may be implemented within the context of other networks besides telecommunications networks. That is, using cloud-based cookies and a corresponding cookie ledger as described herein, in some embodiments, may be implemented within a corporate and/or enterprise intranet, local area network, data center, and/or wide area network (WAN). Network environment 100 may also comprise, or otherwise be coupled to, at least one data network (DN) 107 coupled to the operator core network 106 (e.g., via the network edge 105). In some embodiments, UE 110 may access services and/or content provided by one or more cloud-based services 150 hosted by one or more application servers 140 of DN 107.

As shown in FIG. 1, network environment 100 may include at least one cookie ledger 130. In some embodiments, cookie ledger 130 may be hosted by a ledger store 109 (e.g., a data store). Ledger store 109 can include multiple individual cookie ledger instances that store user cookie data for different users and/or different UE 110 in the same manner as described for cookie ledger 130 herein. As described herein, cookie ledger 130 may include one or more cookie records 132 that are recorded to the cookie ledger 130 using a blockchain technology. In some embodiments, each instance of cookie data may be saved as a cookie record 132 associated with a cookie name that may be selected by the cloud-based service using the cookie data. One or more of such cookie records 132 may be recorded as a block to the cookie ledger 130. The cookie records 132 may be subsequently accessed by the cloud-based service 150, as described herein, to access cookie data by the corresponding cookie name. In some embodiments, each block of the cookie ledger 130 comprises a cumulative record of cookies associated with the reference ID (or at least of non-expired cookies) so that the cloud-based service 150 may need only to access the most recent block to obtain comprehensive access to all of the cookie data associated with cookie names that it is authorized by its cookie access token to access. In some embodiments, each block of the cookie ledger 130 may instead (or also) provide reference to cookie data recorded to prior blocks of the cookie ledger 130 such that the cloud-based service 150 may initially access the most recent block of the cookie ledger 130, and then use the reference provided by that block to locate on the cookie ledger 130 and access previously recorded blocks storing the cookie names/cookie data of interest to the cloud-based service 150.

In some embodiments, the cookie ledger 130 may comprise, for example, an element of a distributed ledger network (DLN) and/or distributed ledger technology (DLT)-based records repository. As such, while FIG. 1 illustrates cookie ledger 130 hosted by a distinct ledger store 109, in some embodiments, the cookie ledger 130 may be distributed across multiple network nodes of the network environment 100. In some embodiments, the ledger store 109 may be implemented by a data store or server of the DN 107.

Generally, an individual UE 110 may comprise a device capable of unidirectional or bidirectional communication with the access network 104 via wireless and/or wired communication links. The network environment 100 may be configured for wirelessly connecting UEs 110 to other UEs 110 via the same access network 104, via other access networks, via other telecommunications networks, and/or to connect UEs to a public switched telecommunication network (PSTN). The network environment 100 may be generally configured for wirelessly connecting a UE 110 to data or services that may be accessible on one or more application servers or other functions, nodes, or servers. The network environment 100 may be generally configured, in some embodiments, for wirelessly connecting UE 110 to data or services that may be accessible on one or more application servers or other functions, nodes, or servers (such as by servers 140 of data network 107).

UE 110 are in general forms of equipment and machines such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the UE 110 may include both mobile UE and stationary UE. Moreover, UE 110 may comprise 3GPP and non-3GPP devices.

The UE 110 can include one or more processors and one or more non-transient computer-readable media for executing code to carry out the functions of the UE 110 described herein (including in some embodiments, one or more functions of a cookie service gateway 114). The computer-readable media may include computer-readable instructions executable by the one or more processors. In some embodiments, the UE 110 and/or cookie service gateway 114 may be implemented using a computing device 1000, as discussed below with respect to FIG. 10.

As previously discussed, in accordance with one or more embodiments, rather than the cloud-based service 150 accessing cookie data from text files on a local device drive of UE 110, cookie data is instead recorded to cookie ledger 130. When a cloud-service client application 112 (e.g., a browser) operating on UE 110 is directed to access cloud-based service 150, the cloud-based service 150 may cause the cloud-service client application 112 to call for access to one or more cookies (e.g., by cookie name) via a request to the cookie service gateway 114.

Figure 2:
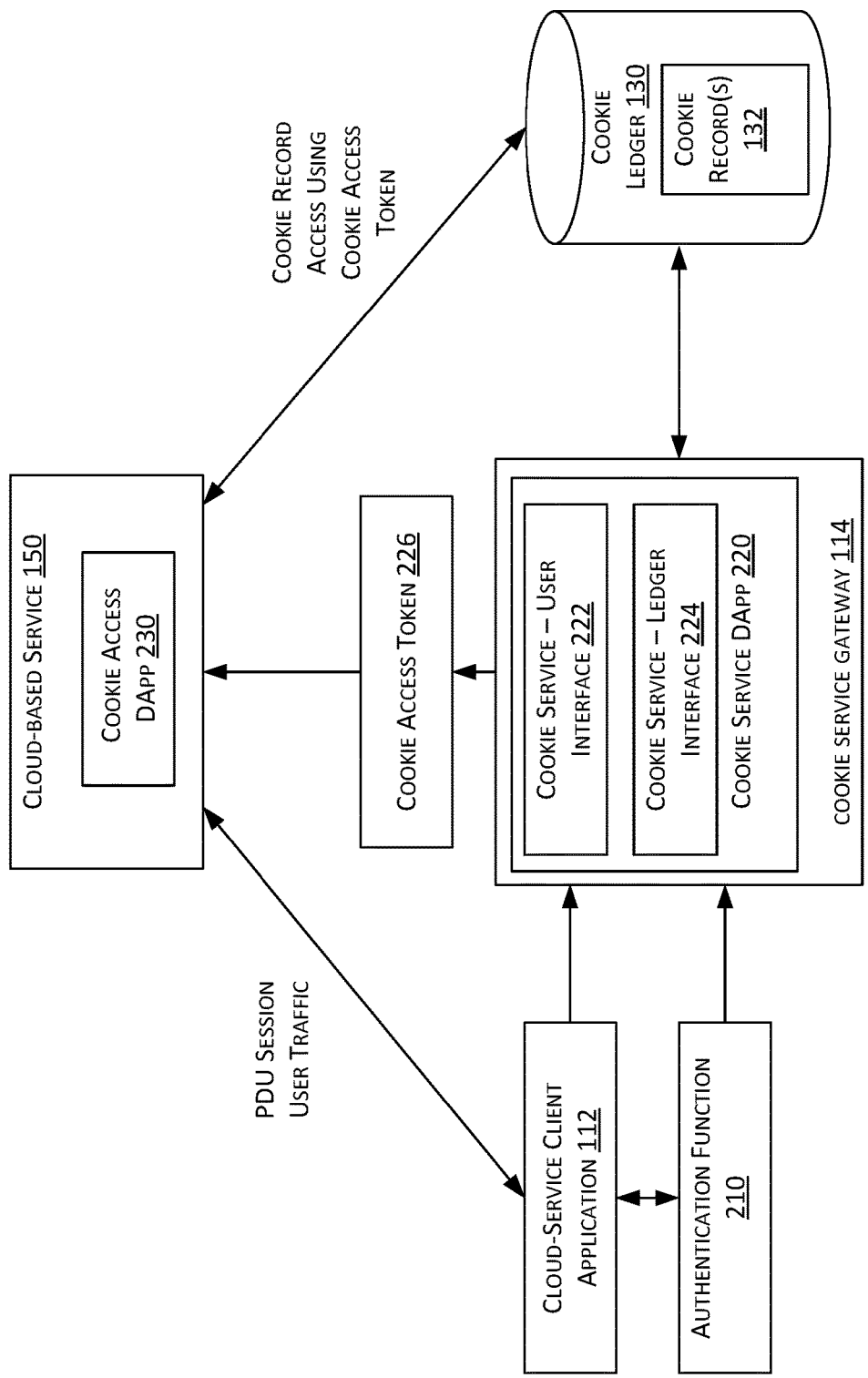
FIG. 2 is an example data flow diagram illustrating ledger-based cookies for a telecommunications network, in accordance with some embodiments described herein.

For example, referring now to FIG. 2, FIG. 2 illustrates an example data flow diagram for ledger-based cookies for a telecommunications network, such as that illustrated by the network environment 100 of FIG. 1. In the example shown in FIG. 2, to access cookie record(s) 132 from the cookie ledger 130, the cloud-based service 150 is granted a cookie access token 226 by the cookie service gateway 114. To verify that authorization has been received to provide the cookie access token 226, the cookie service gateway 114 may receive an authentication (e.g., credentials) from an authentication function 210 of UE 110. In some embodiments, a user associated with UE 110 may provide credentials that are used by authentication function 210 to authenticate the user with the cookie service gateway 114. For example, for a UE 110 comprising a computer, smartphone and/or tablet, the user of that device may log in to the device (e.g., using a passcode) to authenticate the user and provide cookie service gateway 114 with authorization to issue a cookie access token 226 to a requesting cloud-based service 150. For a UE 110 comprising a smart device or IoT device (e.g., a smart appliance, thermostat, smart device hub, etc.), the UE 110 may have preloaded credentials associated with a user or operator of that UE 110 that serves as authorization to cookie service gateway 114 to issue a cookie access token 226 to a requesting cloud-based service 150.

In some embodiments, in response to cloud-service client application 112 accessing the cloud-based service 150 (e.g., following a URL address to a website for cloud-based service 150), the cloud-based service 150 may request access to one or more cookies. The cloud-service client application 112 may direct the request to the cookie service gateway 114. The cookie service gateway 114 may then generate the cookie access token 226, which may be used by the cloud-based service 150 to access records holding the requested cookies from the cookie ledger 130. In some embodiments, the cookie service gateway 114 may generate the cookie access token 226 using one or more DApps 220. Based on the access request from the cloud-based service 150 and the authentication (e.g., credentials) from the authentication function, the cookie service gateway 114 may generate a cookie access token 226 that indicates a reference ID and/or other information corresponding to the cookie ledger 130 (e.g., indicating a network address for the cookie ledger 13) and the cookie record(s) 132 having the cookie data requested by the cloud-based service 150. For example, in some embodiments, the cookie access token 226 may comprise keys or other code that the cloud-based service 150 may use to execute one or more smart contracts embedded into the cookie record(s) 132, with those smart contracts providing the cloud-based service 150 with access to the cookie data corresponding to cookie names (or other identifiers) authorized or otherwise indicated by the cookie access token 226. The cloud-based service 150 may then read the cookie data from the cookie record(s) 132. In this way, the cloud-based service 150 may obtain cookie data used for remembering credentials and/or preferences, tracking website browsing activity, providing personalized content, and/or storing other data. In some embodiments, the cookie data may include links and/or tokens for non-fungible tokens (NFTs) that are owned by the user. Access to such NFTs may be used by the cloud-based service 150 to serve and/or present content to the UE 110, conduct one or more transactions on behalf of the user, and/or record data associated with such transactions. Privacy is enhanced because access to the cookie data may be limited to the individual cloud-based service 150 receiving the cookie access token 226, and that cloud-based service 150 is restricted to reading specified sets of cookie data from the individual cookie records 132 authorized by the cookie access token 226. Moreover, while the cloud-based service 150 receives a reference ID for locating the cookie ledger 130 and/or cookie record(s) 132, that reference ID provided by the cookie service gateway 114 is not tied to an ID or credential of the user or UE 110, and the cloud-based service 150 cannot tie the reference ID or retrieved cookie data to personal identifiable information (PII), unless the user intentionally allows it. In addition to the cookie access token 226 permitting the cloud-based service 150 to read cookie data from cookie record(s) 132, in some embodiments, a cookie access token 226 may optionally permit the cloud-based service 150 to write data to the cookie ledger 130 to either update cookie data associated with a cookie name and/or to create a record for a new cookie with a new cookie name. For example, using the cookie access token 226, the cloud-based service 150 may interact with one or more smart contracts of the cookie ledger 130 to execute functions to create new records and store those records to the cookie ledger 130 as new blocks. In some embodiments, the cookie access token 226 may be valid for only a predetermined duration of time. For example, in some embodiments, the cookie access token 226 may remain valid for the duration of a communicating session (e.g., a protocol data unit (PDU) session) between the UE 110 and the cloud-based service 150, and may expire upon termination of that session.

As also illustrated in FIG. 2, in some embodiments, the cookie service gateway 114 may execute one or more cookie service DApps 220 to create the cookie access token 226 provided to cloud-based service 150. The cookie service DApp(s) 220 may include a cookie service user interface 222 through which the cloud-service client application 112, authentication function 210, and/or other functions of the UE 110 can interact with the cookie service DApp(s) 220. The cookie service DApp(s) 220 may include a cookie service ledger interface 224, which utilizes credentials from the authentication function 210 and requests information from the cloud-service client application 112 to apply cryptographic algorithms to generate the cookie access token 226. In some embodiments, the cookie service DApp(s) 220 may communicate with one or more cookie access DApps 230 executed by the cloud-based service 150 via the cookie service ledger interface 224 to facilitate access to requested cookie data from the cookie ledger 130. In some embodiments, the cookie service DApp(s) 220 may communicate with one or more smart contracts embedded in cookie records 132 of cookie ledger 130. For example, the cookie service DApp(s) 220 may execute functions of the smart contracts to generate a new block to the cookie ledger 130 updating and/or replacing one or more of the smart contracts. In some embodiments, the cookie service gateway 114 may use cookie service DApp(s) 220 to set one or more smart contract parameters to limit access to one or more previously recorded cookie records 132 and/or to one or more specified cookies. That is, although the cookie ledger 130 may be an immutable blockchain repository of cookie data, a user via the cookie service gateway 114 may configure a smart contract in the cookie ledger 130 to not let a cloud-based service 150 access a specified instance of cookie data.

In some embodiments, cookie ledger 130 may be implemented at least in part using a distributed file storage protocol such as the Interplanetary File System (IPFS). In such implementations, a unique address is derived by performing a hash of a cookie record contents. The hash may produce a Content Identifier (CID), which may be used as an address to locate a cookie record (e.g., used as the cookie ledger's reference ID). In some embodiments, the reference ID for identifying the cookie ledger 130 may comprise one or more decentralized identifiers (DIDs), such as World Wide Web Consortium (W3C) DIDs, for example. In some embodiments, a reference ID comprises a DID that resolves to a DID document. The DID document may be stored at a data registry (e.g., a verifiable data registry). For example, a DID may include a Universal Resource Identifier (URI) that associates the cookie ledger 130 (as a DID subject) with a DID document. The DID may include, for example, cryptographic public keys that the cloud-based service 150 may use to authenticate itself with the cookie ledger 130 and prove its association with the reference ID indicated in the cookie access token 226. In some embodiments, the reference ID may be based on a self-sovereign identity (SSI) paradigm. For example, in such an embodiment, the cloud-based service 150 may present its cookie access token 226 with reference ID to the operator core network 106, which may verify that the cookie access token 226 was issued from a trusted issuer and therefore may be used to access the cookie ledger 130.

Figure 3A:
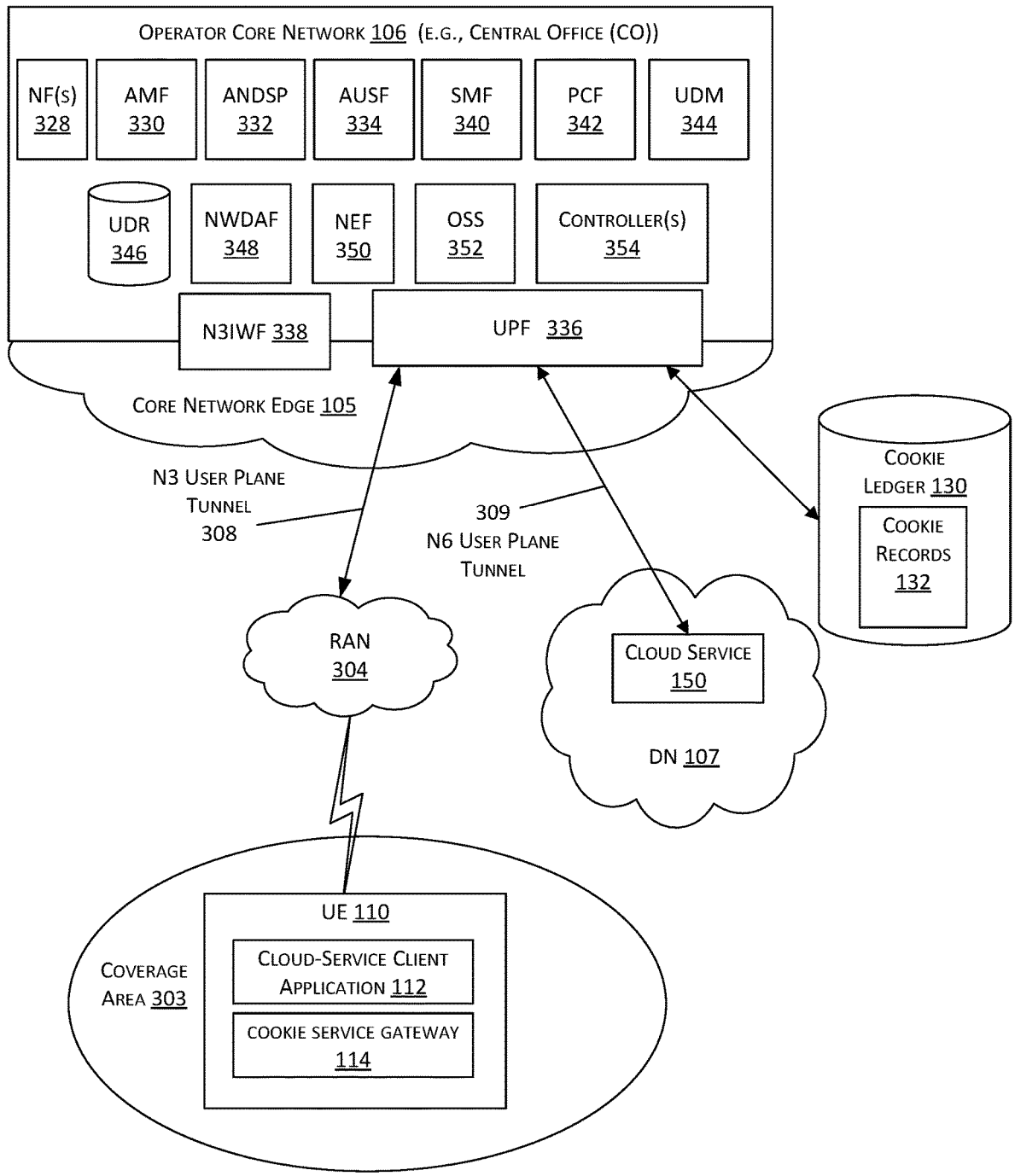
FIG. 3A is a diagram of an example implementation of the network environment of FIG. 1 illustrating 3GPP user equipment attached to the operator core network via a radio access network.

Referring now to FIG. 3A, FIG. 3A illustrates an example implementation of the networking environment 100 of FIG. 1, wherein the access network 104 comprises at least a 3GPP-based Radio Access Network (RAN) 304. In some embodiments, the RAN 304 comprises a wireless RF cellular access network, often referred to as a cellular base station. The RAN 304 may be referred to as a gNodeB in the context of a 5G New Radio (NR) implementation, or other terminology depending on the specific implementation technology. In some embodiments, the RAN 304 may comprise in part components of a customer premises network, such as a distributed antenna system (DAS), for example. In some embodiments, the RAN 304 may comprise a non-terrestrial base station, such as a base station implemented by an Earth-orbiting satellite. The UE 110 may operate within a coverage area 303 of the RAN 304. The UE 110 within the context of FIG. 3A is a trusted 3GPP UE that can authenticate with the operator core network 106 via a connection with the RAN 304.

The operator core network 106 may comprise modules, also referred to as network functions (NFs), generally represented in FIG. 3A as NF(s) 328. Such network functions may include, but are not limited to, one or more of a core access and mobility management function (AMF) 330, an access network discovery and selection policy (ANDSP) 332, an authentication server function (AUSF) 334, a user plane function (UPF) 336, a non-3GPP Interworking Function (N3IWF) 338, a session management function (SMF) 340, a policy control function (PCF) 342, unified data management (UDM) 344, a unified data repository (UDR) 346, Network Data Analytics Function (NWDAF) 348, a network exposure function (NEF) 350, and an operations support system (OSS) 352. Implementation of these NFs of the operator core network 106 may be executed by one or more controllers 354 on which these network functions are orchestrated or otherwise configured to execute utilizing processors and memory of the one or more controllers 354. The NFs may be implemented as physical and/or virtual network functions, container network functions, and/or cloud-native network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 330 in the 3GPP 5G architecture is configured for various functions relating to security and access management and authorization, including registration management, connection management, paging, and mobility management; in other forms, such as a 4G architecture, the AMF 330 of FIG. 3A may take the form of a mobility management entity (MME). The operator core network 106 may be generally said to authorize rights to and facilitate access to an application server/service such as is provided by application function(s) requested by one or more UEs, such as UE 110. In some embodiments, the at least one data network (DN) 107 may be coupled to the operator core network 106, for example, via the network edge 105.

As shown in FIG. 3A, UPF 336 represents at least one function of the operator core network 106 that may extend into the core network edge 105. In some embodiments, the RAN 304 is coupled to the UPF 336 within the core network edge 105 by a communication link that includes an N3 user plane tunnel 308. For example, the N3 user plane tunnel 308 may connect a cell site router of the RAN 304 to an N3 interface of the UPF 336. In some embodiments, the cookie ledger 130 may be implemented at least in part by a data store coupled to one or more NFs of the operator core network 106. The cookie ledger 130, for example, may be coupled to the UPF 336. In some embodiments, where the cookie ledger 130 is hosted by a servicer of DN 107, cookie ledger 130 may be coupled to the UPF 336 in the core network edge 105 or operator core network 106 by an N6 user plane tunnel 309. The N6 user plane tunnel 309 may connect a network interface (e.g., a switch, router, and/or gateway) of the DN 107 to an N6 interface of the UPF 336. In some embodiments, one or more aspects of cookie ledger 130 may be implemented at least in part as a component of the operator core network 106. In some embodiments, cloud-based service 150 can access cookie ledger 130 and transport cookie data at least in part as user plane traffic via a connection to UPF 336 based on credentials provided via cookie access token 226.

The AMF 330 facilitates mobility management, registration management, and connection management for 3GPP devices, such as a UE 110. ANDSP 332 facilitates mobility management, registration management, and connection management for non-3GPP devices. AUSF 334 may receive authentication requests from the AMF 330 and interacts with UDM 344, for example, for Subscriber Identification Module (SIM) authentication and/or to authenticate a UE 110 based on another device ID. N3IWF 338 provides a secure gateway for non-3GPP network access, which may be used for providing connections for UE 110 access to the operator core network 106 over a non-3GPP access network. SMF module 340 facilitates initial creation of protocol data unit (PDU) sessions using session establishment procedures. In some embodiments, the SMF module 340 or other network function of the operator core network 106 may notify to the cookie service gateway 114 when a session between the UE 110 and cloud-based service 150 terminates, and the cookie service gateway 114 may revoke the cookie access token 226 corresponding to that session in response.

The PCF 342 maintains and applies policy control decisions and subscription information. Additionally, in some aspects, the PCF 342 maintains quality of service (QOS) policy rules. For example, the QoS rules stored in a unified data repository (UDR) 346 can identify a set of access permissions, resource allocations, or any other QoS policy established by an operator. In some embodiments, the PCF 342 maintains subscription information indicating one or more services and/or microservices subscribed to by each UE 110. Such subscription information may include subscription information pertaining to a subscription for access to the cookie ledger 130. That is, cloud-based cookies may be provided by the operator core network as a microservice that can be utilized by UE 110 that has a cookie service gateway 114. The UDM 344 manages network user data including, but not limited to, data storage management, subscription management, policy control, and operator core network 106 exposure. NWDAF 348 collects data (for example, from UE, other network functions, application functions and operations, administration, and maintenance (OAM) systems) that can be used for network data analytics. The OSS 352 is responsible for the management and orchestration of the operator core network 106, and the various physical network functions, virtual network functions, container network functions, controllers, compute nodes, and other elements that implement the operator core network 106.

Some aspects of network environment 100 include the UDR 346 storing information relating to access control and service and/or microservice subscriptions. The UDR 346 may be configured to store information relating to such subscriber information and may be accessible by multiple different NFs in order to perform desirable functions. For example, the UDR 346 may be accessed by the AMF 330 in order to determine subscriber information pertaining to the UE 110, accessed by a PCF 342 to obtain policy-related data, and/or accessed by NEF 350 to obtain data that is permitted for exposure to third-party applications (such as applications executed by UE 110, for example). In some embodiments, DApp 220 or other functions of the cookie service gateway 114 may work in conjunction with information from the UDR 346 and/or NEF 350 to generate a cookie access token 226 that will provide cloud-based server 150 and/or cookie access DApp 230 with credentials to access the cookie ledger 130 via the telecommunications network environment 100. Other functions of the NEF 350 include monitoring of UE-related events and posting information about those events for use by external entities, and providing an interface for provisioning UEs (via PCF 342) and reporting provisioning events to the UDR 346. Although depicted as a unified data management module, UDR 346 can be implemented as a plurality of network function (NF) specific data management modules.

The UPF 336 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 336 may establish a dedicated network slice for one or more data channels of the UE 110 that act, in essence, as a distinct network (for example, establishing its own QoS, provisioning, and/or security) within the same physical network architecture of the core network edge 105. For example, in different implementations, a UE 110 may be assigned a network slice such as an Enhanced Mobile Broadband (eMBB) 5G network slice, a Massive Machine-Type Communications (MMTC) 5G network slice, an Ultra-Reliable Low-Latency Communication (URLLC) 5G network slice, or a Public Safety (PS) 5G network slice.

Figure 3B:
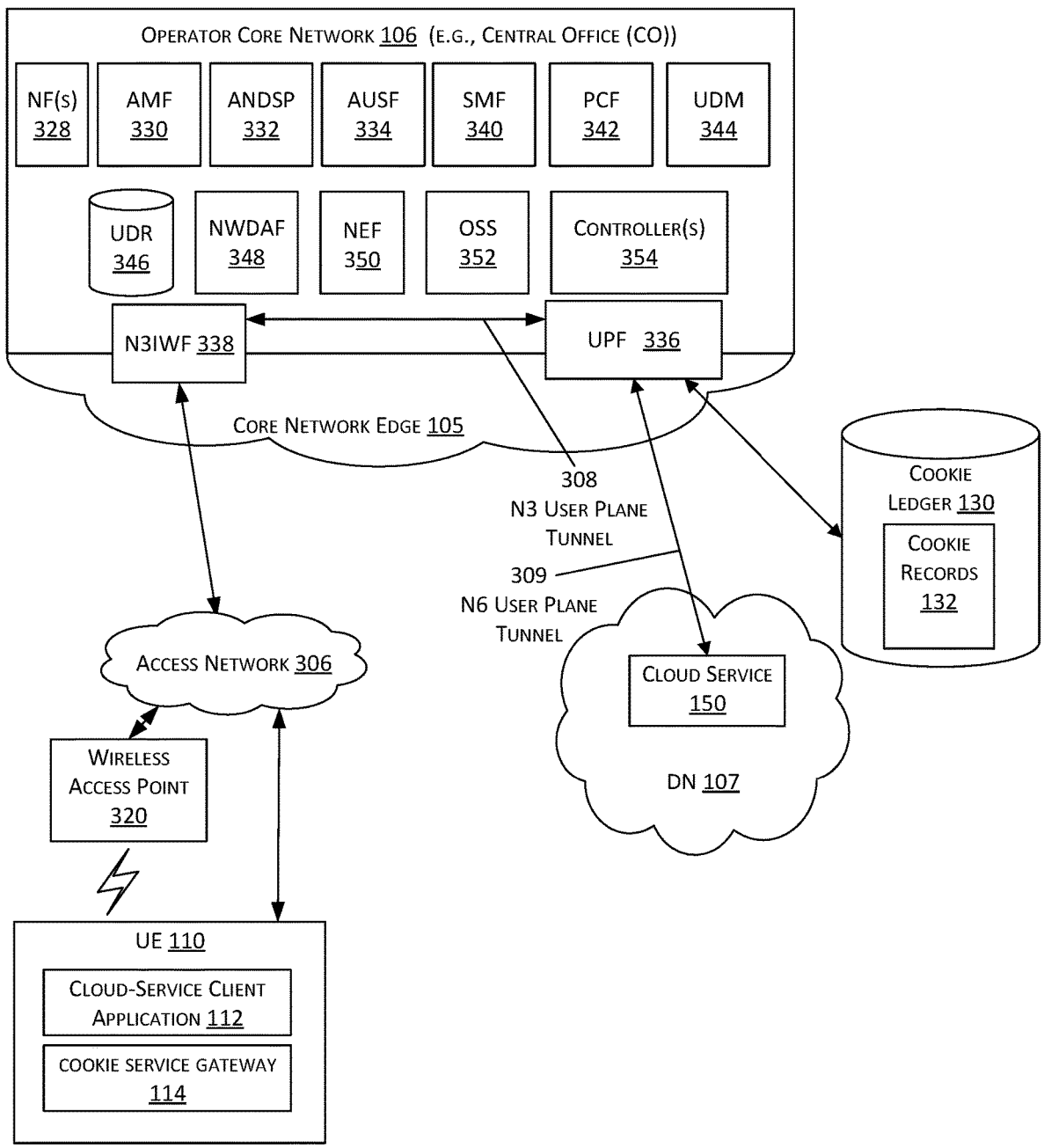
FIG. 3B is a diagram of an example implementation of the network environment of FIG. 1 illustrating non-3GPP user equipment attached to the operator core network via a non-3GPP access network.

Referring now to FIG. 3B, FIG. 3B illustrates an example implementation of the networking environment 100 of FIG. 1, wherein the access network 104 comprises a non-3GPP access network 306 (such as a customer premise equipment (CPE) network, for example). For example, the access network 306 may comprise a wide area network (WAN) or local area network (LAN) and/or may include one or more wireless access points (WAPs) 320. In such embodiments, the non-3GPP access network 306 represents an untrusted network from the perspective of the operator core network 106. The UE 110 that connect through the access network 306 may therefore represent untrusted UE 110. Accordingly, communication between the operator core network 106 and UE 110 may be established via the non-3GPP Interworking Function (N3IWF) 338. For example, in some embodiments, a UE 110 may authenticate with a WAP 320 to establish a wireless communications link with the access network 306. In some embodiments, a UE 110 may be coupled with the access network 306 using a network cable to establish a wired network communication link.

UE 110 connecting via the non-3GPP access network 306 may be coupled to, and authenticated with, the N3IWF 338 of the operator core network 106. For example, an IPsec user plane tunnel and/or IPsec control plane tunnel may be created to establish a secure communication link between the UE 110 and the N3IWF 338. The N3IWF 338 may be coupled to the UPF 336 by a communication link that includes an N3 user plane tunnel 308. For example, the N3 user plane tunnel 308 may connect a router or network gateway of the non-3GPP access network 306 to an N3 interface of the UPF 336.

It should be understood that in some embodiments, the network environment 100 may comprise a combination of the implementations shown in FIGS. 3A and 3B where UE access may be provided to the network environment through 3GPP and non-3GPP access networks.

Figure 4:
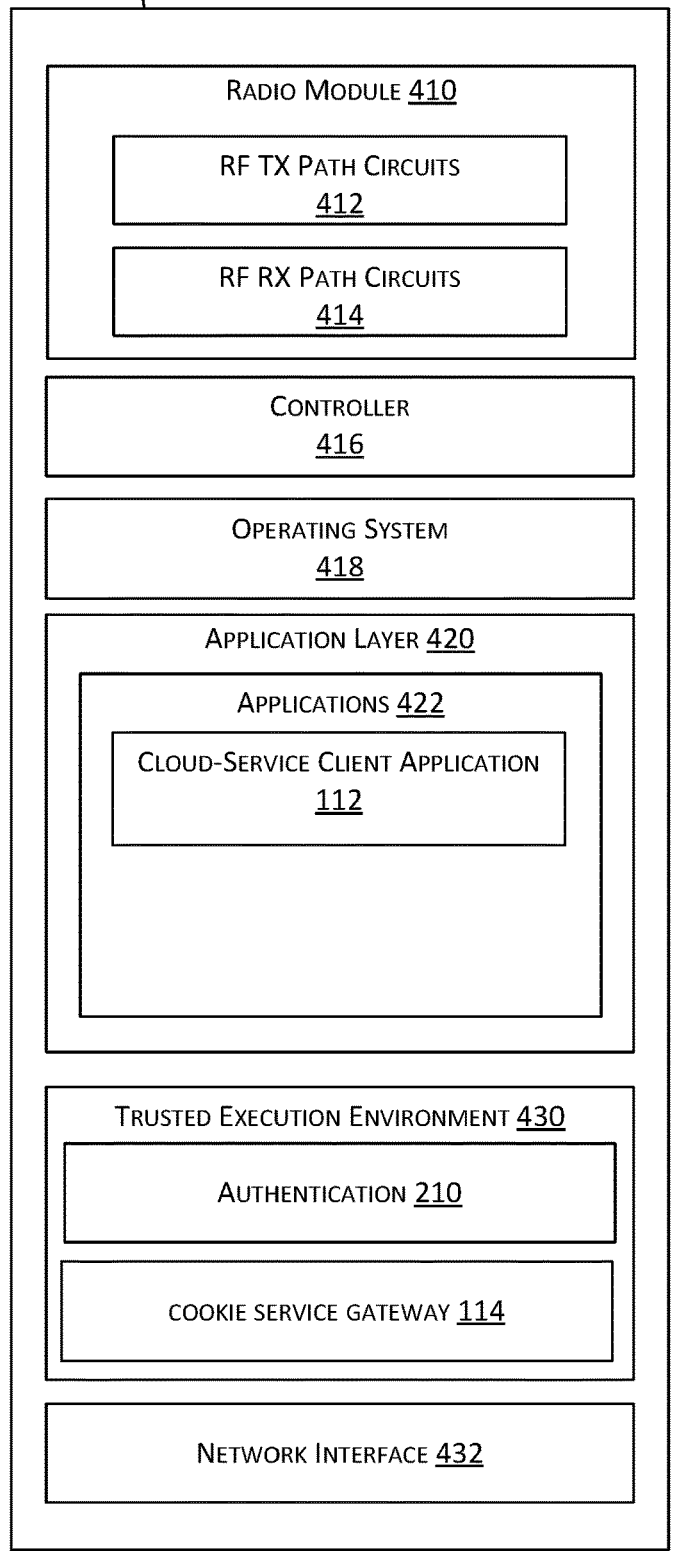
FIG. 4 is a diagram illustrating an example user equipment comprising a cookie service gateway, in accordance with some embodiments described herein.

With reference now to FIG. 4, FIG. 4 illustrates an example UE 400 (such as UE 110) that executes one or more elements of a cookie service gateway 114. Although some UEs may include different or other components, generally UE 400 includes at least one radio module 410 that includes one or more RF transmit (TX) path 412 circuits, one or more RF receive (RX) path 414 circuits, and a controller 416. Configuration of the RF TX path 412 and/or RF RX path 414 may be controlled by the radio module 410, for example, based on commands from the operating system 418 or other applications executed on the controller 416. In some embodiments one or both of the TX path 412 and/or RF RX path 414 may comprise a plurality of RF paths, each corresponding to different frequency bands. In some embodiments, the UE 400 in FIG. 4 may authenticate with the operator core network 106 and access the telecommunications network through the RAN 304 (for example, using the radio module 410). In some embodiments, the UE 400 may authenticate with the operator core network 106 via the N3IWF 338 and access the telecommunications network wirelessly through an access network 304 (for example, using the radio module 410) or via a wired network interface 432.

In the embodiment shown in FIG. 4, the UE 400 includes operating system 418 and one or more executable applications 422 that are executed by the controller 416 to implement the one or more functions of the UE 110 described herein, including the cookie service gateway 114. Generally a UE 400 includes at least application layer 420 and may include a trusted execution environment (TEE) 430. The application layer 420 facilitates execution of the UE 400 operating system 418 and executables (including applications 422). In other words, the application layer 420 provides the direct user interaction environment for the UE 400. TEE 430 facilitates a secure area of the processor(s) of UE 400. That is, TEE 430 provides an environment in the UE 400 where isolated execution and confidentiality features are enforced. Example TEEs that may be used for UE 400 include, but are not limited to, Arm TrustZone technology, Software Guard Extensions (SGX) technology, Reduced Instruction Set Computer-Five (RISC-V), or similar technologies.

In some embodiments, application layer 420 may include applications executed in a rich environment and/or applications executed in the TEE 430. For example, the application layer 420 may comprise the cloud-service client application 112 (e.g., a web browser application) and/or other application(s) for interacting with cloud-based service 150. The cookie service gateway 114 and/or authentication function 210 may be executed in the rich environment, and/or at least partially executed in the TEE 430. That is, the cookie service gateway 114 and/or the authentication function 210 may be implemented at least in part as a "trustlet" in a trusted environment protected from tampering or manipulation by a hardware Root of Trust and hosted from the TEE 430. Generally, computer-readable code executed in the TEE 430 is referred to as a "trustlet." A trustlet can securely access data-stored memory of the UE 400 that is otherwise inaccessible in the application layer 420. A trustlet may take the form of trusted processes, secure processes, isolated user mode (IUM) processes, or the like. For example, a trustlet executed in TEE 430 can access system-level data (that is, data related to the larger machine the UE 400 is incorporated within), private and/or public keys, and similar data stored, or accessed, by the UE 400. Trustlets can be activated in response to various network or UE operations. For example, a trustlet can be activated by execution of an associated application in the application layer 420. In some embodiments, a trustlet for cookie service gateway 114 may be activated by the cloud-service client application 112 based on an interaction with cloud-based service 150 requesting access to cookie data. For another example, a trustlet can be activated in response to a command generated by a network (e.g., operator core network 106 of FIG. 1) and communicated to the UE 400.

Figure 5:
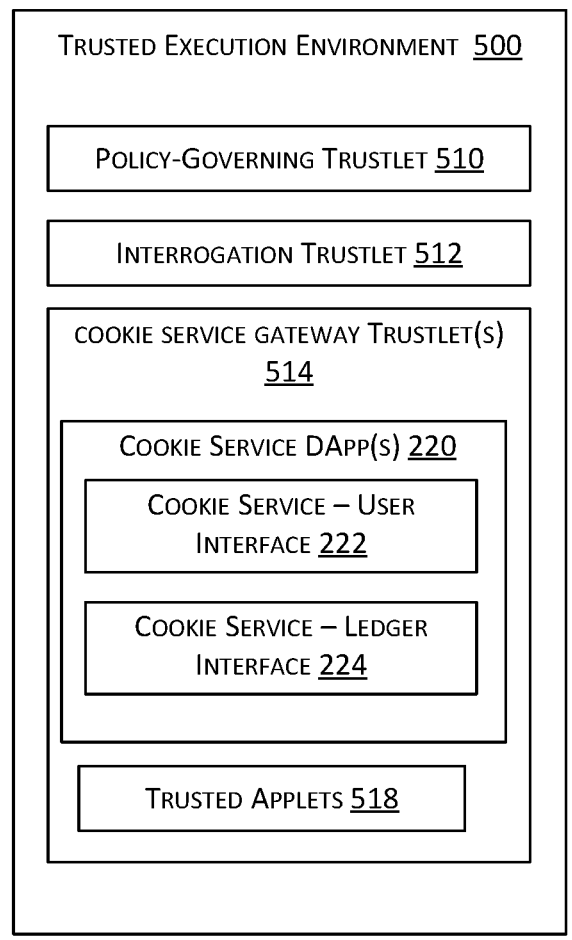
FIG. 5 is a diagram illustrating an example trusted execution environment comprising aspects of a cookie service gateway, in accordance with some embodiments described herein.

Referring now to FIG. 5, FIG. 5 illustrates a TEE 500. In some embodiments, TEE 430 of FIG. 4 comprises a TEE 500, as described with respect to FIG. 5. As depicted, TEE 500 illustratively may include a policy-governing trustlet 510, an interrogation trustlet 512, and at least one cookie service gateway trustlet 514 that may include the cookie service DApp(s) 220 for cookie service gateway 114. In other embodiments, a TEE 500 may include a fewer or greater number of trustlets.

Policy-governing trustlet 510 corresponds to an illustrative example of computer-readable code that is activated in response to execution of an application or operation. Upon activation, policy-governing trustlet 510 may access a locally stored set of keys corresponding to the application and the UE's and/or network device's processor. Such keys may be utilized for establishing a secured communication link between the cookie service gateway 114 and cookie ledger 130 and/or cloud-based service 150.

Additionally, policy-governing trustlet 510 may access a UE's and/or network device's unique device identifier (device ID). In some embodiments, the device ID may comprise an International Mobile Equipment Identity (IMEI) identifier and/or a Mobile Equipment Identifier (MEID). The IMEI may be stored in a subscriber identity module (SIM) card or embedded SIM (eSIM) of the UE 110 and transmitted to the operator core network 106 as part of the process to authenticate the UE 110. In some embodiments, a device ID may comprise one or more elements of an integrated circuit card identifier (ICCID), a permanent equipment identifier (PEI), mobile subscriber international subscriber directory number (MSISDN), mobile subscription identification number (MSIN), international mobile subscriber identity (IMSI), mobile country codes (MCC), subscription permanent identifier (SUPI), mobile network codes (MNC), and/or other identifier. In some embodiments, the device ID may comprise one or more decentralized identifiers (DIDs), such as World Wide Web Consortium (W3C) DIDs, for example. In some embodiments, a device ID comprises a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 may use to authenticate itself with the operator core network 106 and prove its association with the DID (e.g., the device ID). In some embodiments, the device ID may be based on a self-sovereign identity (SSI) paradigm where the UE 110 may present its device ID to the operator core network 106, which may verify that the device ID was issued from a trusted issuer. In some embodiments, a device ID may comprise a combination of identifiers, such as any of those described herein. The device ID may comprise a combination of hardware identifiers, network address identifiers, serial numbers, component identifiers (e.g., CPU IDs), and/or other identifiers, such as those discussed herein. In some embodiments, a device ID may be managed (using a DApp, crypto wallet, or the like, for example) and verified using public-key cryptography in conjunction with a distributed ledger. For example, in some embodiments the device ID for a UE 110 may be generated by a backend blockchain ledger and downloaded to the UE 110.

Interrogation trustlet 512 corresponds to an illustrative example of computer-readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 512 may activate other trustlets, access additional data, or perform any other trustlet operation. The interrogation trustlet 512 may communicate the accessed data to a network function of the operator core network 106. For example, interrogation trustlet 512 can be activated in response to a command that a network function 328 or server application from a server on data network 107 has requested data from one or more trustlets executed in the trusted execution environment 500. In some embodiments, a cookie service gateway trustlet 514 may be activated by the interrogation trustlet 512 in response to a request for access to the cookie ledger 130. Other trusted applets 518 may also be executed to perform one or more secure operations with the cookie ledger 130 either instead of, or in conjunction with, the DApp(s) 220.

Figure 6:
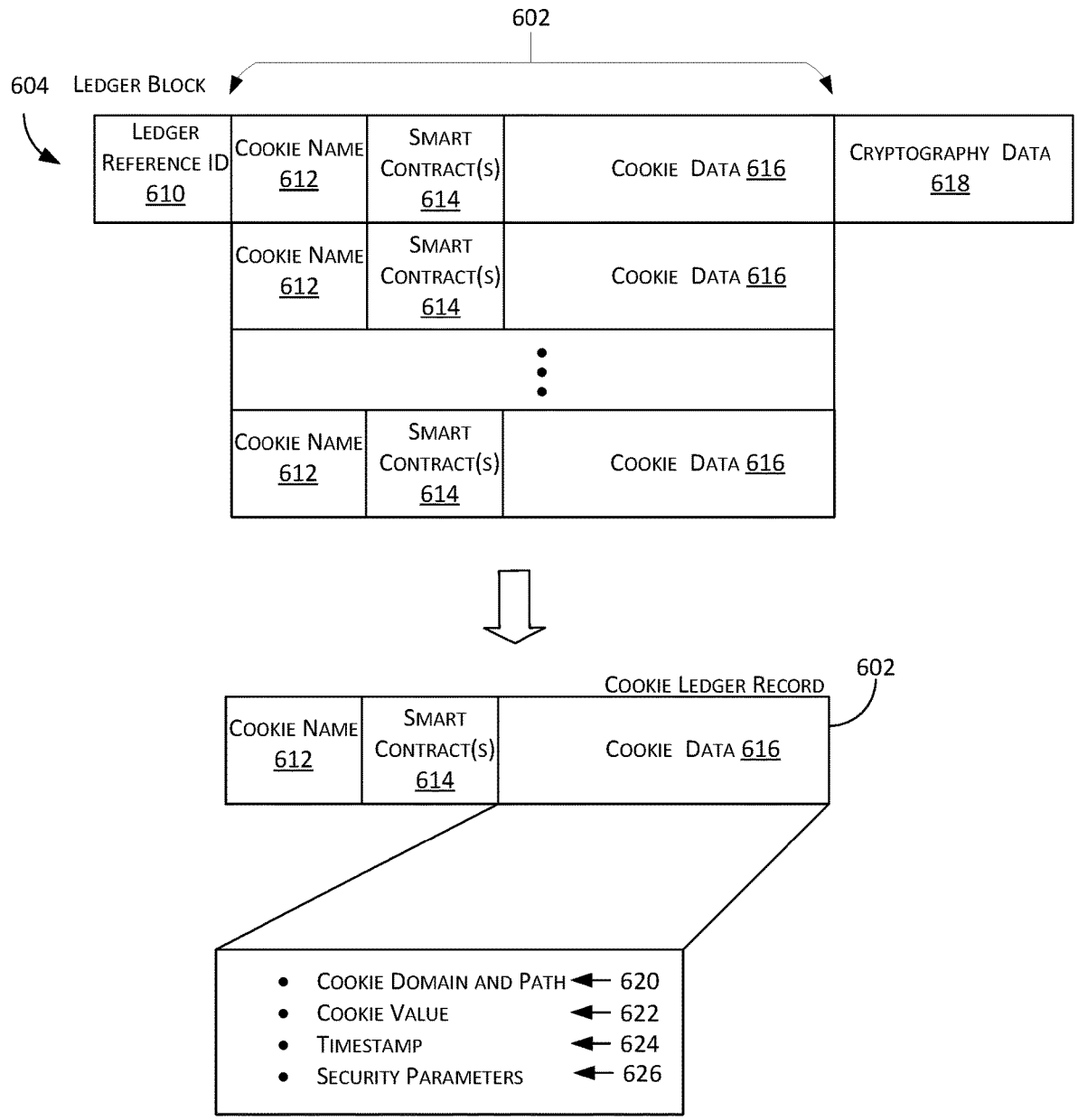
FIG. 6 is a diagram illustrating an example ledger block and cookie ledger record for a network-connected cookie ledger, in accordance with some embodiments described herein.

Referring now to FIG. 6, FIG. 6 illustrates an example cookie record 602 (such as one of cookie records 132) for storing cookie data as recorded in cookie ledger 130. In one or more embodiments, cookie record 602 may comprise a constituent ledger record of a ledger block 604 of the cookie ledger 130. That is, at least one cookie ledger record 602 may define a record of a block structured as a blockchain block for inclusion in a blockchain structure of the cookie ledger 130. A block 604 of the cookie ledger 130 may, in some embodiments, include multiple cookie record 602 instances that may individually correspond to a cookie having a distinct cookie name. As mentioned herein, the cookie ledger 130 may comprise, for example, an element of a distributed ledger network (DLN) and/or distributed ledger technology (DLT)-based records repository. In some embodiments, the cookie ledger comprises a hyperledger blockchain technology.

The ledger block 604 may comprise a ledger reference ID 610 that correlates the cookie records of that block to the cookie ledger 130, and/or with the cookie access token 226 that gives cloud-based service 150 access to the cookie record(s) 602. That is, ledger reference ID 610 in ledger block 604 may correlate with (e.g., match) the registration ID provided by the cookie service gateway 114 in cookie access token 226.

In some embodiments, the record cryptograph data 618 may include a combination of a hash address and a previous hash address. The hash address may be generated by applying a hashing algorithm to one or more of the contents of the cookie record(s) 602 that may be included in the ledger block 604 of the cookie ledger 130. The previous hash address may comprise the hash address of the preceding block 604 in the cookie ledger 130, thus providing a reference hash address to link subsequent blocks and/or records of the cookie ledger 130 to prior blocks and/or records.

Each cookie record 602 may individually comprise one or more of a cookie name 612, one or more smart contracts 614, and cookie data 616 (e.g., the cookie data sought by the cloud-based service 150). To access the cookie data 616, the cloud-based service 150 may locate the cookie record 602 based on the reference ID using the information provided in the cookie access token 226. The cookie name 612 may correspond to a cookie name selected and used by the cloud-based service 150 to refer to the cookie data so that once the cloud-based service 150 has access to the cookie ledger 130, the specific record having the relevant cookie data 616 sought by the cloud-based service 150 may be located based on the cookie name 612. In some embodiments, the cookie ledger 130 may comprise a plurality of linked ledgers that reference each other so that a particular set of cookie data 616 may be located by the combination of reference ID 610 and cookie name 612. In some embodiments, the cookie ledger 130 may comprise a framework having one or more sidechains corresponding to different sets of cookie records 132 to increase scalability.

In some embodiments, access to the cookie data 616 (e.g., either read access or read-write access) may be controlled by the smart contract(s) 614. As discussed herein, the cloud-based service 150 (e.g., using the cookie access DApp 230) may use the cookie access token 226 to activate the smart contract(s) 914 and/or authenticate itself to the smart contract(s) 614. The smart contract(s) 614 will execute one or more algorithms to permit the cloud-based service 150 access to cookie data 616 as authorized by the cookie access token 226. In some embodiments, the smart contract(s) 614 may include one or more functions that the cloud-based service 150 may activate (e.g., if permitted by the cookie access token 226) to generate one or more new cookie records 602 for the purpose of updating cookie data 616 and/or for creating a new cookie record with a new cookie name 612 to store a different set of cookie data 616. Those new records 602 may then be added by adding one or more new blocks 604 to the blockchain of cookie ledger 130. In some embodiments, as discussed above, smart contract(s) 614 may also be directly executed by the cookie service gateway 114, for example, to generate a new block 604 to upgrade and/or replace one or more of the smart contract(s) 614.

In some embodiments, cookie data 616 may comprise information that references or is otherwise used by the cloud-based service 150 to render one or more services on UE 110. For example, as shown in FIG. 6, cookie data 616 may include cookie domain and path data 620. Cookie domain data may indicate the network domain corresponding to the cloud-based service 150 that consumes the cookie data 616, while the path data may indicate a network path of the node or server within the network domain that consumes the cookie data 616. The cookie value 622 may include the actual payload of information of interest and may be used by the cloud-based service 150.

The cookie data 616 may further include a timestamp 624 indicating a date and/or time when the cookie data 616 was generated. This may be used by the cloud-based service 150 to determine whether the information provided by the cookie value 622 is potentially stale (e.g., outdated). The cookie data 616 may further comprise security parameters 626 (e.g., security flags) that may be used, for example, to set an expiration age for the cookie data, specify the use of secure sockets layer/transport layer security (SSL/TLS) encryption for, and/or other parameters. For example, based on an expiration age from security parameters 626 and the timestamp 624, the cloud-based service 150 may determine that the cookie value 622 has expired and should not be used. Based on that determination, the cloud-based service 150 may activate the smart contracts 614 to generate a new record 602 (e.g., in a new ledger block 604) comprising an updated cookie value 622.

Figure 7:
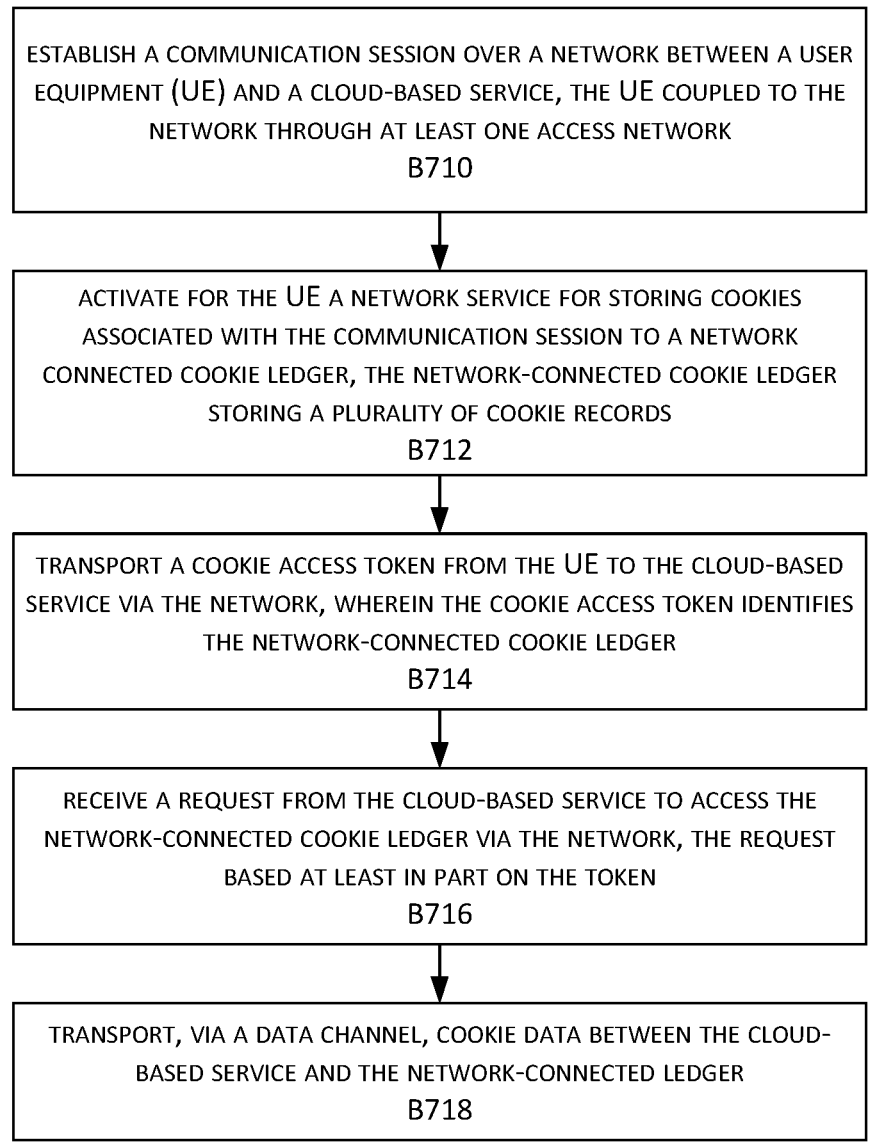
FIG. 7 is a flow chart illustrating an example method for ledger-based cookie management, in accordance with some embodiments described herein.

FIG. 7 is a flow chart illustrating a method 700 for ledger-based cookie management, according to some embodiments. It should be understood that the features and elements described herein with respect to the method of FIG. 7 may be used in conjunction with, in combination with, or substituted for elements of any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa. In some embodiments, elements of method 700 are implemented utilizing one or more processing units, such as the controller of an operator core network, an edge server, a RAN, a UE, network function, application server and/or other processing units as disclosed in any of the embodiments herein. In some embodiments, the method 700 may be implemented by components of a telecommunications network environment 100, such as is illustrated by FIG. 1. In some embodiments, method 700 comprises a method for ledger-based cookie management that may be executed with respect to a network (e.g., a telecommunications network comprising a network operating core, as described herein) that established connectivity between a cloud-service client application executing on a UE and one or more services and/or resources of a cloud-based service (e.g., a website) that may be hosted by an application server operating on a data network coupled to the network. The cloud-based services may utilize a cloud-based cookie ledger (e.g., cookie ledger 130) to store cookie data associated with a session between the cloud-service client application and the cloud-based service. In some embodiments, the cloud-based cookie ledger is a network-connected cookie ledger that may be hosted, at least in part, on a ledger store 109 comprising a data store that functions as a node or function of the operator core network 106, core network edge 105, or other element of the telecommunications network. In some embodiments, the cloud-based cookie ledger is a network-connected cookie ledger that may be hosted, at least in part, on a ledger store 109 comprising a data store implemented by an application server of the data network.

The method 700 at B710 includes establishing a communication session over a network between a user equipment (UE) and a cloud-based service, the UE coupled to the network through at least one access network. In some embodiments, the network comprises a telecommunications network and the UE is coupled to the network through a cellular basestation. In some embodiments, the network comprises a telecommunications network and the UE is coupled to the network through a non-3GPP access network. The communication session may be established over the network between the cloud-based service and a client application of the UE.

The method 700 at B712 includes activating for the UE a network service for storing cookies associated with the communication session to a network-connected cookie ledger, the network-connected cookie ledger storing a plurality of cookie records. The cookie ledger described herein may be accessible as a subscribed service of a telecommunications network and made available as a service to UE that connects through the telecommunications network to reach cloud-based services such as, but not limited to, websites. The UE, in turn, may facilitate access to the cookie ledger to the cloud-based services they interact with by granting a cookie access token, such as is described herein. In some embodiments, activating the UE network service permits the cloud-based services to use the cookie access token granted to them to use resources of the network to communicate with the network-connected cookie ledger (which may be hosted on a node (server and/or network function) of the operator core network and/or core network edge) for the purposes of exchanging cookie data with the cookie ledger.

Accordingly, the method 700 at B714 includes transporting a cookie access token from the UE to the cloud-based service via the network, wherein the cookie access token identifies the network-connected cookie ledger. As described herein, the UE may execute the cookie gateway, and the cookie access token produced by the cookie gateway may further be used by a DApp of the cloud-based services to obtain limited trusted access to services of the telecommunications network for the purpose of accessing the cookie ledger identified by the cookie access token. The network-connected cookie ledger may comprise an immutable repository of cookie data and comprise a blockchain-based ledger technology such as, but not limited to, a Hyperledger technology-based ledger, a distributed ledger network (DLN)-based ledger, and/or a distributed ledger technology (DLT)-based ledger. The cookie access token may comprise a ledger reference ID associated with the network-connected cookie ledger. For example, the ledger reference ID may comprise at least one of, but not limited to, a decentralized identifier (DID) and/or a self-sovereign identity (SSI)-based identifier.

The method 700 at B716 includes receiving a request from the cloud-based service to access the network-connected cookie ledger via the network, the request based at least in part on the token. One or more cookie records may be recorded as a block to the cookie ledger and subsequently accessed by the cloud-based service, as described herein, to receive an instance of cookie data using its corresponding cookie name. In some embodiments, each block of the cookie ledger comprises a cumulative record of cookies associated with the reference ID (or at least of non-expired cookies) so that the cloud-based service may need only to access the most recent block to obtain comprehensive access to all of the cookie data associated with cookie names that it is authorized by its cookie access token to access. In some embodiments, each block of the cookie ledger may instead (or also) provide reference to cookie data recorded to prior blocks of the cookie ledger such that the cloud-based service may initially access the most recent block of the cookie ledger, and then use the reference provided by that block to locate on the cookie ledger and access previously recorded blocks storing the cookie names/cookie data of interest to the cloud-based service. A cookie access token may also permit the cloud-based service to access the cookie ledger to save new cookie data to the cookie ledger, to either update cookie data associated with a cookie name and/or to create a record for a new cookie with a new cookie name. Access to the cookie data (e.g., either read access or read-write access) may be controlled by smart contract(s) by the cloud-based service using the cookie access token.

The method 700 at B718 includes transporting, via a data channel, cookie data between the cloud-based service and the network-connected ledger. One or more cookie records may be recorded as a block to the cookie ledger and subsequently accessed by the cloud-based service, as described herein, to receive an instance of cookie data using its corresponding cookie name. In some embodiments, each block of the cookie ledger 130 comprises a cumulative record of cookies associated with the reference ID (or at least of non-expired cookies) so that the cloud-based service 150 may need only to access the most recent block to obtain comprehensive access to all of the cookie data associated with cookie names that it is authorized by its cookie access token to access. In some embodiments, each block of the cookie ledger 130 may instead (or also) provide reference to cookie data recorded to prior blocks of the cookie ledger 130 such that the cloud-based service 150 may initially access the most recent block of the cookie ledger 130, and then use the reference provided by that block to locate on the cookie ledger 130 and access previously recorded blocks storing the cookie names/cookie data of interest to the cloud-based service 150. As an example, the cookie access token may permit the cloud-based service to execute or otherwise interact with a smart contract recorded in the cookie ledger to access one or more sets of cookie data, where each set of cookie data is associated with a cookie name that the cloud-based service may use to refer to that set of cookie data. To update cookie data, or generate a new set of cookie data (e.g., under a new cookie name), the cloud-based service may use the cookie access token to execute a function of the smart contract to generate a new cookie ledger record and add the new cookie ledger record with the new or updated cookie data to the ledger. In some embodiments, the cloud-based service may comprise a decentralized application (DApp) that uses the cookie access token to interact with the cookie ledger and/or smart contracts. As such, the method may include executing at least one DApp based on the cookie access token to exchange the cookie data between the cloud-based service and the network-connected cookie ledger. In some embodiments, the cookie access token may be revoked in response to a termination of the communication session. In some embodiments, the data channel between the cloud-based service and the network-connected cookie ledger may be terminated in response to a termination of the communication session.

Figure 8:
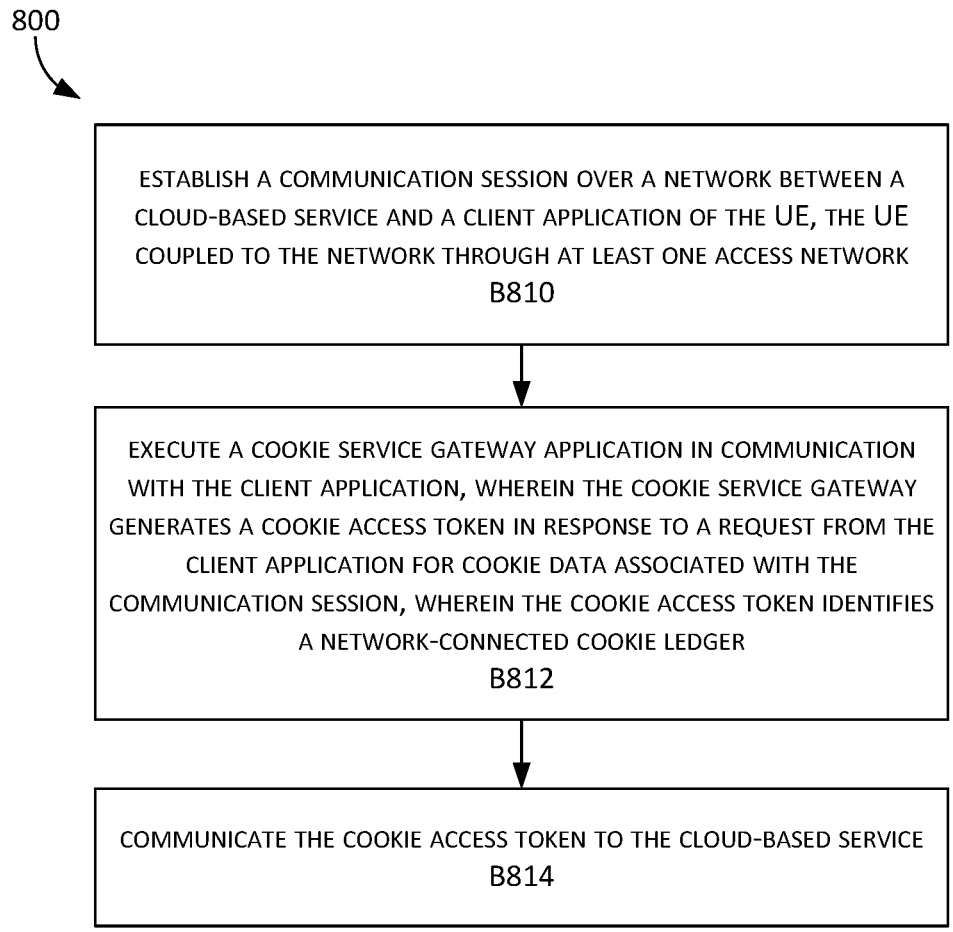
FIG. 8 is a flow chart illustrating an example method for ledger-based cookie management, in accordance with some embodiments described herein.

FIG. 8 is a flow chart illustrating a method 800 for ledger-based cookie management, according to some embodiments. It should be understood that the features and elements described herein with respect to the method of FIG. 8 may be used in conjunction with, in combination with, or substituted for elements of any of the other embodiments discussed herein and vice versa. Further, it should be understood that the functions, structures, and other descriptions of elements for embodiments described in FIG. 8 may apply to like or similarly named or described elements across any of the figures and/or embodiments described herein and vice versa. In some embodiments, elements of method 800 are implemented utilizing one or more processing units, such as the controller of an operator core network, an edge server, a RAN, a UE, network function, application server and/or other processing units, as disclosed in any of the embodiments herein. In some embodiments, the method 800 may be implemented by components of a telecommunications network environment 100, such as that illustrated by FIG. 1. In some embodiments, method 800 comprises a method for ledger-based cookie management that may be executed with respect to an UE (e.g., UE 110) executing a cloud-service client application in order to access one or more services and/or resources of a cloud-based service (e.g., a website), wherein the cloud-based service utilizes a cloud-based cookie ledger (e.g., cookie ledger 130) to store cookie data associated with a session between the cloud-service client application and the cloud-based service.

The method 800 at B810 includes establishing a communication session over a network between a cloud-based service and a client application of the UE, the UE coupled to the network through at least one access network. As illustrated in FIG. 4, the UE may comprise a radio module through which the UE establishes the communication session over the network via the radio module. In some embodiments, the network comprises a telecommunications network and the UE is coupled to the network through a cellular basestation. In some embodiments, the network comprises a telecommunications network and the UE is coupled to the network through a non-3GPP access network.

The method 800 at B812 includes executing a cookie service gateway application in communication with the client application, wherein the cookie service gateway generates a cookie access token in response to a request from the client application for cookie data associated with the communication session, wherein the cookie access token identifies a network-connected cookie ledger. For example, when the client application (such as a browser) on the UE 110 is directed to a cloud-based service 150, the cloud-based service 150 may call for access to a cookie and the request may be passed by the client application to the cookie service gateway 114. The cookie service gateway 114 may verify the authenticity of the user and then generate a cookie access token that it transmits to the cloud-based service. The cloud-based service 150 may then use the cookie access token to locate the cookie ledger 130 and access one or more records 132 storing cookie data used by the cloud-based service. The cookie service gateway 114 may generate the cookie access token 226 using one or more DApps 220. The method may include executing a cookie service decentralized application (DApp) of the cookie service gateway in a trusted execution environment of the UE to generate the cookie access token. Based on the access request from the cloud-based service 150 and an authentication by an authentication function, the cookie service gateway 114 may generate a cookie access token 226 that indicates a reference ID and/or other information corresponding to the cookie ledger 130 (e.g., indicating a network address for the cookie ledger 13) and the cookie record(s) 132 having the cookie data requested by the cloud-based service 150. In some embodiments, the cookie service gateway is configured to communicate with at least one smart contract stored in the network-connected cookie ledger. The network-connected cookie ledger may comprise an immutable repository of cookie data and comprise a blockchain-based ledger technology such as, but not limited to, a Hyperledger technology-based ledger, a distributed ledger network (DLN)-based ledger, and/or a distributed ledger technology (DLT)-based ledger. The cookie access token may comprise a ledger reference ID associated with the network-connected cookie ledger. For example, the ledger reference ID may comprise at least one of, but not limited to, a decentralized identifier (DID) and/or a self-sovereign identity (SSI)-based identifier.

The method 800 at B814 includes communicating the cookie access token to the—cloud-based service. For example, the cloud service client may receive the cookie access token generated by the cookie service gateway and send it to the cloud-based service via the network. In some embodiments, the cookie service gateway may be configured to communicate with at least one cookie access DApp used by the cloud-based service to interface with a smart contract stored in the network-connected cookie ledger. In some embodiments, the cookie access token may be revoked in response to a termination of the communication session.

Figure 9:
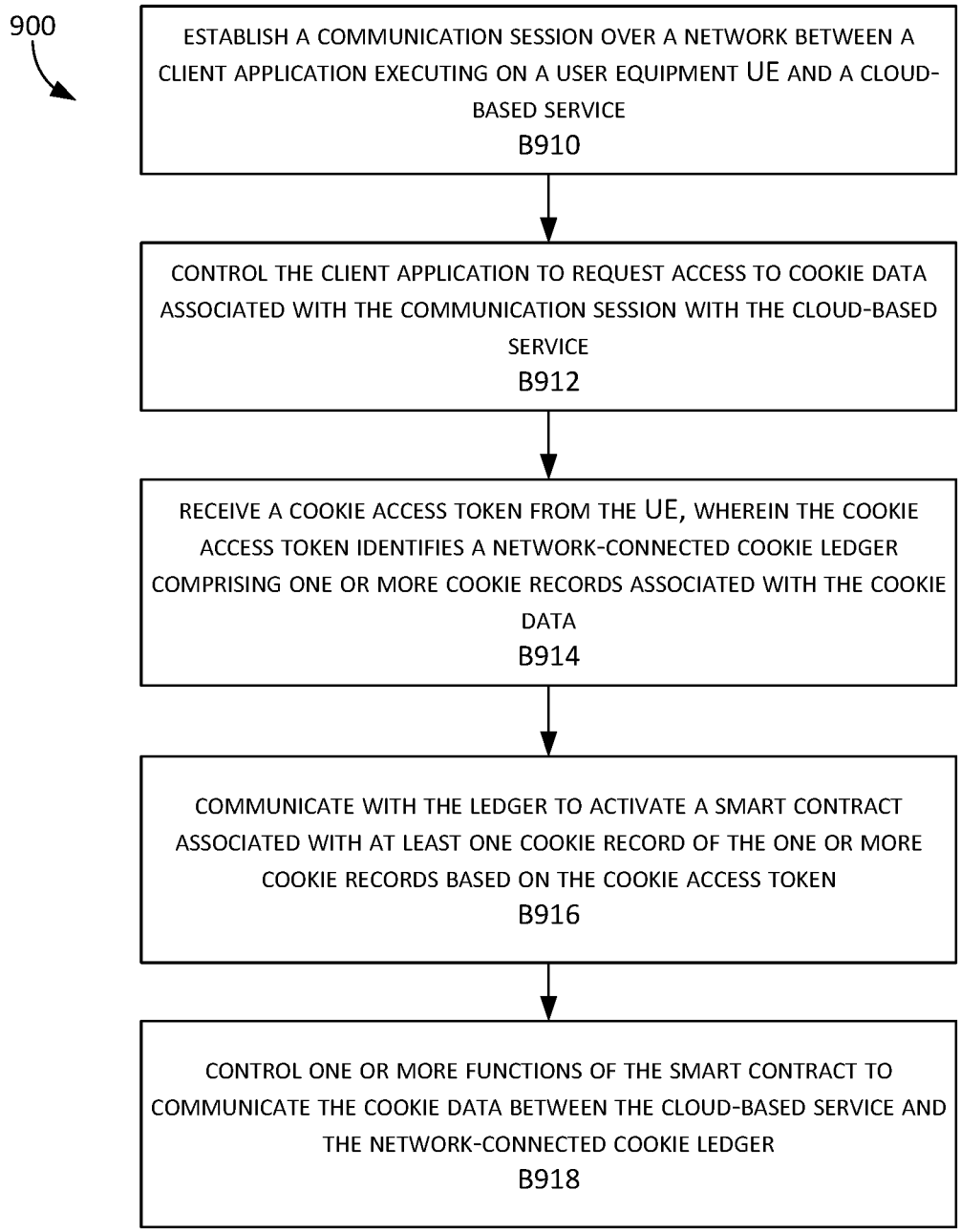
FIG. 9 is a flow chart illustrating an example method for ledger-based cookie management, in accordance with some embodiments described herein.

FIG. 9 is a flow chart illustrating a method 900 for ledger-based cookie management, according to some embodiments. It should be understood that the features and elements described herein with respect to the method of FIG. 9 may be used in conjunction with, in combination with, or substituted for elements of any of the other embodiments discussed herein and vice versa. Further, it should be understood that the functions, structures, and other descriptions of elements for embodiments described in FIG. 9 may apply to like or similarly named or described elements across any of the figures and/or embodiments described herein and vice versa. In some embodiments, elements of method 900 are implemented utilizing one or more processing units, such as the controller of an operator core network, an edge server, a RAN, a UE, network function, application server and/or other processing units, as disclosed in any of the embodiments herein. In some embodiments, the method 900 may be implemented by components of a telecommunications network environment 100, such as that illustrated by FIG. 1. In some embodiments, method 900 comprises a method for ledger-based cookie management that may be executed with respect to an application server (e.g., application servicer 140) executing a cloud-based service (e.g., a website) utilizing a cloud-based cookie ledger (e.g., cookie ledger 130) to store cookie data associated with a session with a cloud-service client application (e.g., a browser or other application) on a UE 110.

The method 900 at B910 includes establishing a communication session over a network between a client application executing on a user equipment UE and a cloud-based service. In some embodiments, the network comprises a telecommunications network and the UE is coupled to the network through a cellular basestation. In some embodiments, the network comprises a telecommunications network and the UE is coupled to the network through a non-3GPP access network.

The method 900 at B912 includes controlling the client application to request access to cookie data associated with the communication session with the cloud-based service. For example, when the client application (such as a browser) on the UE 110 is directed to a cloud-based service 150, the cloud-based service 150 may call for access to a cookie and the request may be passed by the client application to the cookie service gateway 114. The cookie service gateway 114 may verify the authenticity of the user and then generate a cookie access token that it transmits to the cloud-based service. The cloud-based service 150 may then use the cookie access token to locate the cookie ledger 130 and access one or more records 132 storing cookie data used by the cloud-based service.

The method 900 at B914 includes receiving a cookie access token from the UE, wherein the cookie access token identifies a network-connected cookie ledger comprising one or more cookie records associated with the cookie data. The network-connected cookie ledger may comprise an immutable repository of cookie data and comprise a blockchain-based ledger technology such as, but not limited to, a Hyperledger technology-based ledger, a distributed ledger network (DLN)-based ledger, and/or a distributed ledger technology (DLT)-based ledger. The cookie access token may comprise a ledger reference ID associated with the network-connected cookie ledger. For example, the ledger reference ID may comprise at least one of, but not limited to, a decentralized identifier (DID) and/or a self-sovereign identity (SSI)-based identifier.

The method 900 at B916 includes communicating with the ledger to activate a smart contract associated with at least one cookie record of the one or more cookie records based on the cookie access token. The at least one cookie record of the one or more cookie records may be associated with the ledger reference identifier provided by the cookie access token. The network service establishes the data channel between the cloud-based service and the network-connected cookie ledger based at least in part on the cookie access token.

The method 900 at B918 includes controlling one or more functions of the smart contract to communicate the cookie data between the cloud-based service and the network-connected cookie ledger. As an example, the cookie access token may permit the cloud-based service to execute or otherwise interact with a smart contract recorded in the cookie ledger to access one or more sets of cookie data, where each set of cookie data is associated with a cookie name that the cloud-based service may use to refer to that set of cookie data. To update cookie data, or generate a new set of cookie data (e.g., under a new cookie name), the cloud-based service may use the cookie access token to execute a function of the smart contract to generate a new cookie ledger record and add the new cookie ledger record with the new or updated cookie data to the ledger. In some embodiments, the cloud-based service may comprise a decentralized application (DApp) that uses the cookie access token to interact with the cookie ledger and/or smart contracts. As such, the method may include executing at least one DApp based on the cookie access token to exchange the cookie data between the cloud-based service and the network-connected cookie ledger. In some embodiments, the cookie access token may be revoked in response to a termination of the communication session. In some embodiments, the data channel between the cloud-based service and the network-connected cookie ledger may be terminated in response to a termination of the communication session.

Figure 10:
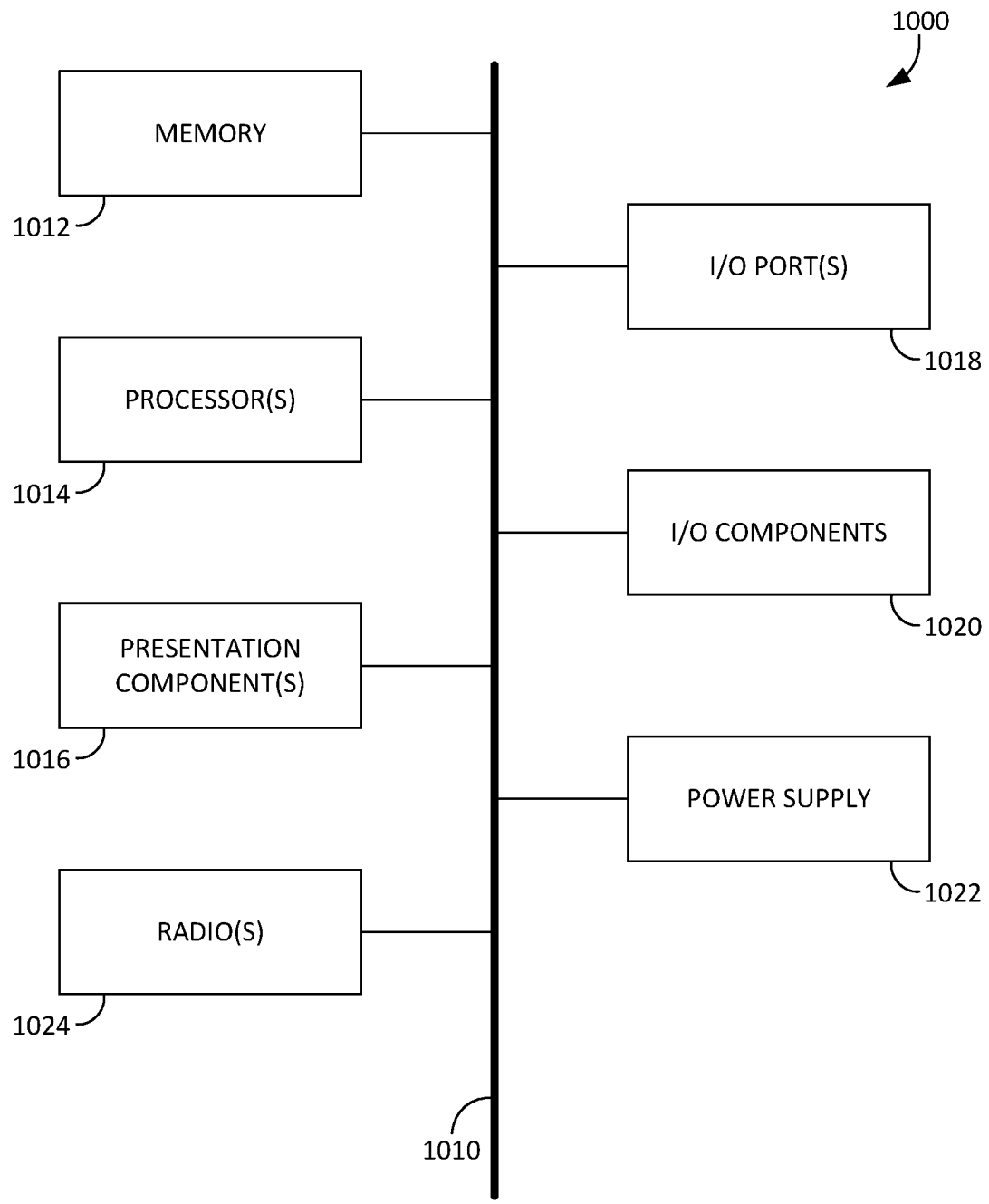
FIG. 10 is an example computing device, in accordance with some embodiments described herein.

Referring to FIG. 10, a diagram is depicted of an exemplary computing environment suitable for use in implementations of the present disclosure. In particular, the exemplary computer environment is shown and designated generally as computing device 1000. Computing device 1000 is but one example of a suitable computing environment and is not intended to suggest any limitation as to the scope of use or functionality of the embodiments described herein. Neither should computing device 1000 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 10, computing device 1000 includes bus 1010 that directly or indirectly couples the following devices: memory 1012, one or more processors 1014, one or more presentation components 1016, input/output (I/O) ports 1018, I/O components 1020, power supply 1022, and radio 1024. Bus 1010 represents what may be one or more buses (such as an address bus, data bus, or combination thereof). The devices of FIG. 10 are shown with lines for the sake of clarity. However, it should be understood that the functions performed by one or more components of the computing device 1000 may be combined or distributed amongst the various components. For example, a presentation component such as a display device may be one of I/O components 1020. In some embodiments, one or more functions of a cookie service gateway 114 and/or cookie ledger 130 may be executed at least in part by a computing device such as computing device 1000. The processors of computing device 1000, such as one or more processors 1014, have memory. The present disclosure hereof recognizes that such is the nature of the art, and reiterates that FIG. 10 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or non-volatile memory. Memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. One or more presentation components 1016 presents data indications to a person or other device. Exemplary one or more presentation components 1016 include a display device, speaker, printing component, vibrating component, etc. I/O ports 1018 allow computing device 1000 to be logically coupled to other devices including I/O components 1020, some of which may be built into computing device 1000. Illustrative I/O components 1020 include a microphone, joystick, game pad, satellite dish, scanner, printer, wireless device, etc.

Radio(s) 1024 represents a radio that facilitates communication with a wireless telecommunications network. For example, radio(s) 1024 may be used to establish communications with components of the access network 104, RAN 304, access network 306, operator core network 106, and/or core network edge 105. Illustrative wireless telecommunications technologies include CDMA, GPRS, TDMA, GSM, and the like. Radio(s) 1024 may additionally or alternatively facilitate other types of wireless communications including Wi-Fi, WiMAX, LTE, and/or other VOIP communications. As an example, the RF transmit path circuit 412 and RX receiver path circuits 414 of radio module 410 may be implemented using radio(s) 1024. In some embodiments, radio(s) 1024 may support multimodal connections that include a combination of 3GPP radio technologies (e.g., 4G, 5G, and/or 6G) and/or non-3GPP radio technologies. As can be appreciated, in various embodiments, radio(s) 1024 can be configured to support multiple technologies (e.g., multiple radio access technologies (RATs) and/or multiple radios can be utilized to support multiple technologies. In some embodiments, the radio(s) 1024 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 11:
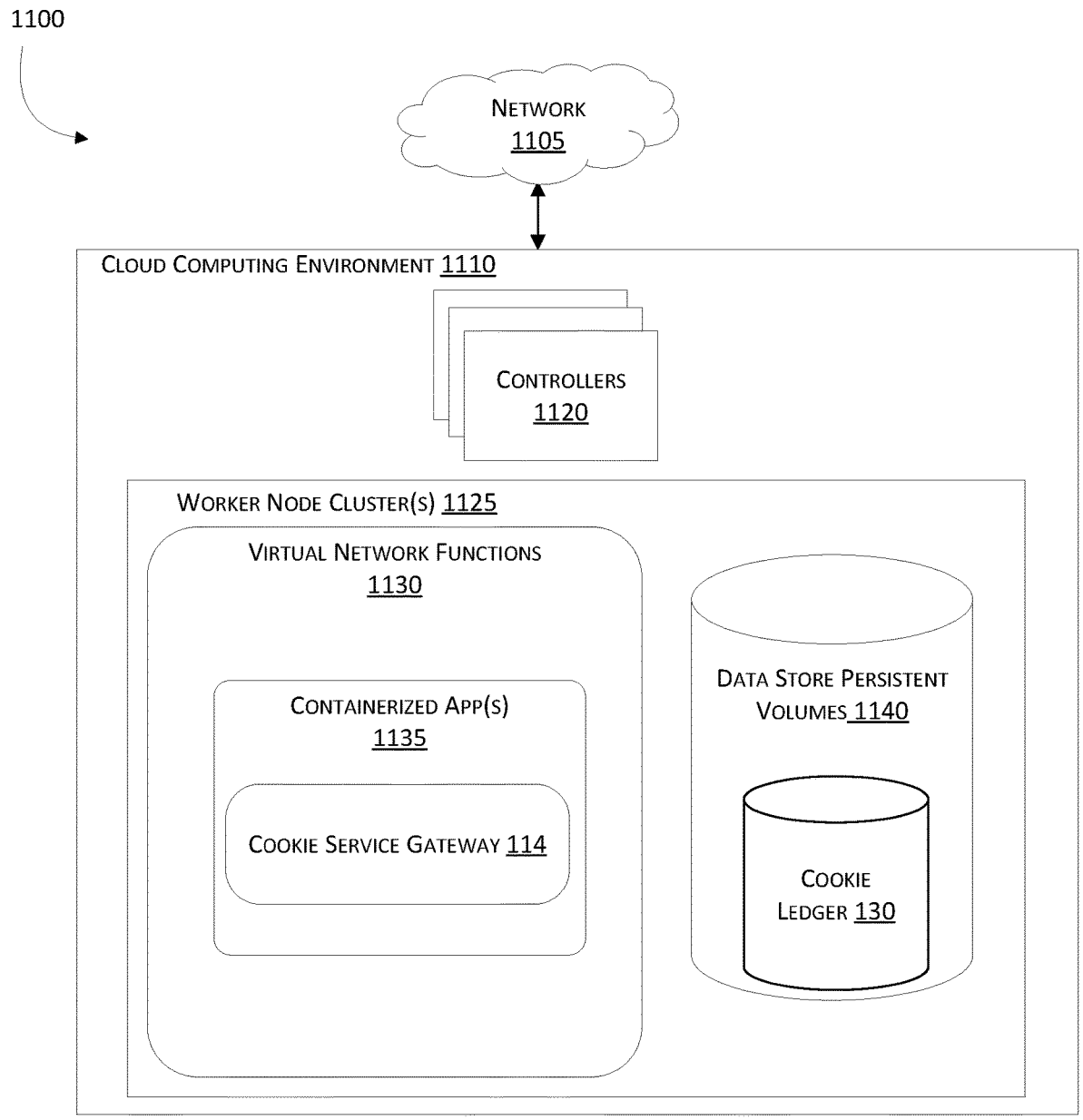
FIG. 11 is an example cloud computing platform, in accordance with some embodiments described herein.

Referring to FIG. 11, a diagram is depicted generally at 1100 of an exemplary cloud computing environment 1110 for implementing one or more aspects of a ledger-based cookie management as implemented by the systems and methods described herein. Cloud computing environment 1110 is but one example of a suitable cloud computing environment and is not intended to suggest any limitation as to the scope of use or functionality of the embodiments presented herein. Neither should cloud computing environment 1110 be interpreted as having any dependency or requirement relating to any one or combination of components illustrated. In some embodiments, the cloud computing environment 1110 is coupled to a network 1105 (e.g., the core network edge 105) and/or may be executed at least in part within operator core network 106, the core network edge 105, or otherwise coupled to the core network edge 105 or operator core network 106. As previously mentioned, in some embodiments, one or more functions described herein pertaining to the cookie service gateway 114 may be executed on cloud computing environment 1110 instead of, or in addition to, being executed on a UE 110.

Cloud computing environment 1110 includes one or more controllers 1120 comprising one or more processors and memory. The controllers 1120 may comprise servers of a data center. In some embodiments, the controllers 120 are programmed to execute code to implement at least one or more aspects of the cookie service gateway 114 and/or cookie ledger 130. For example, in one embodiment cookie service gateway 114 and/or any of the network functions discussed herein, may be implemented as one or more virtual network functions (VNFs) (which may include one or more container network functions (CNFs)) 1130 running on a worker node cluster 1125 established by the controllers 1120.

The cluster of worker nodes 1125 may include one or more orchestrated Kubernetes (K8s) pods that realize one or more containerized applications 1135. In other embodiments, another orchestration system may be used. For example, the worker nodes 1125 may use lightweight Kubernetes (K3s) pods, Docker Swarm instances, and/or other orchestration tools. In some embodiments, one or more elements of the network environment 100 may be implemented by, or coupled to, the controllers 1120 of the cloud computing environment 1110 by operator core network 106 and/or core network edge 105. In some embodiments, cookie ledger 130 may be implemented at least in part as one or more data store persistent volumes 1140 in the cloud computing environment 1110.

In various alternative embodiments, system and/or device elements, method steps, or example implementations described throughout this disclosure (such as the UE, access networks, core network edge, operator core network, network function, policy enforcement points, policy decision points, cookie service gateway, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples said code stored on a non-transient hardware data storage device. Therefore, other embodiments of the present disclosure may include elements comprising program instructions resident on computer-readable media that, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

As used herein, the terms "function," "unit," "server," "node," "gateway," and "module" are used to describe computer processing components and/or one or more computer-executable services being executed on one or more computer processing components. In the context of this disclosure, such terms used in this manner would be understood by one skilled in the art to refer to specific network elements and not used as nonce word or intended to invoke 35 U.S.C. 112 (f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for ledger-based cookie management, the system comprising:
   one or more processors; and
   one or more non-transient computer storage media storing computer-usable instructions that, when executed by the one or more processors, cause the one or more processors to:
   establish a communication session over a network between a user equipment (UE) and a cloud-based service, the UE coupled to the network through at least one access network;
   activate for the UE a network service for storing cookies associated with the communication session to a network-connected cookie ledger, the network-connected cookie ledger storing a plurality of cookie records;
   execute a gateway at the UE, wherein the gateway generates a cookie access token in response to receiving an authentication of a user of the UE, wherein the cookie access token comprises an authorization for the cloud-based service to access cookie data from the network-connected cookie ledger storing the plurality of cookie records;
   transport the cookie access token from the UE to the cloud-based service via the network, wherein the cookie access token identifies the network-connected cookie ledger;
   receive a request from the cloud-based service to access the network-connected cookie ledger via the network, the request based at least in part on the cookie access token; and
   transport, via a data channel, cookie data between the cloud-based service and the network-connected cookie ledger, wherein the cookie access token expires upon termination of the communication session.

2. The system of claim 1, the one or more processors further to:
   terminate the data channel between the cloud-based service and the network-connected cookie ledger in response to a termination of the communication session.

3. The system of claim 1, wherein the network comprises a telecommunications network, and the UE is coupled to the network through a cellular base station.

4. The system of claim 1, wherein the cookie access token comprises a ledger reference identifier (ID) associated with the network-connected cookie ledger.

5. The system of claim 4, wherein the ledger reference ID comprises at least one of:
   a decentralized identifier (DID); and
   a self-sovereign identity (SSI)-based identifier.

6. The system of claim 1, wherein the network service establishes the data channel between the cloud-based service and the network-connected cookie ledger based at least in part on the cookie access token.

7. The system of claim 1, wherein the network-connected cookie ledger comprises at least one of:
   a Hyperledger technology-based ledger;
   a blockchain technology-based ledger;
   a distributed ledger network (DLN)-based ledger; and
   a distributed ledger technology (DLT)-based ledger.

8. A system for ledger-based cookie management, the system comprising:
   a user equipment (UE) comprising one or more processors and one or more computer-readable media storing computer-usable instructions that, when executed by the one or more processors, cause the one or more processors to:

establish a communication session over a network between a cloud-based service and a client application of the UE, the UE coupled to the network through at least one access network;

execute a cookie service gateway at the UE, wherein the cookie service gateway is in communication with the client application, wherein the cookie service gateway generates a cookie access token in response to a request from the client application for cookie data associated with the communication session and further in response to receiving an authentication of a user of the UE, wherein the cookie access token comprises an authorization for a cloud-based service to access cookie data from a network-connected cookie ledger storing a plurality of cookie records, wherein the cookie access token identifies the network-connected cookie ledger; and communicate the cookie access token to the cloud-based service, wherein the cookie access token expires upon termination of the communication session.

9. The system of claim 8, the one or more processors further to:

generate the cookie access token to reference at least one cookie ledger record of the network-connected cookie ledger associated with the cookie data.

10. The system of claim 8, wherein the ledger reference ID comprises at least one of:

a decentralized identifier (DID); and a self-sovereign identity (SSI)-based identifier.

11. The system of claim 8, wherein the network-connected cookie ledger comprises at least one of:

a Hyperledger technology-based ledger;

a blockchain technology-based ledger;

a distributed ledger network (DLN)-based ledger; and a distributed ledger technology (DLT)-based ledger.

12. The system of claim 8, the one or more processors further to:

execute a cookie service decentralized application (DApp) of the cookie service gateway in a trusted execution environment of the UE to generate the cookie access token.

13. The system of claim 12, wherein the cookie service gateway is configured to communicate with at least one cookie access DAPP used by the cloud-based service to interface with a smart contract stored in the network-connected cookie ledger.

14. The system of claim 12, wherein the cookie service gateway is configured to communicate with at least one smart contract stored in the network-connected cookie ledger.

15. The system of claim 8, wherein the UE further comprises a radio module, wherein the UE establishes the communication session over the network via the radio module.

16. A method for ledger-based cookie management, the method comprising:

establishing a communication session over a network between a client application executing on a user equipment (UE) and a cloud-based service;

controlling the client application to request access to cookie data associated with the communication session with the cloud-based service;

receiving, from the UE, a cookie access token generated by a cookie service gateway at the UE in response to receiving an authentication of a user of the UE, wherein the cookie access token comprises an authorization for the cloud-based service to access cookie data from a network-connected cookie ledger storing one or more cookie records associated with the cookie data and identifies the network-connected cookie ledger;

communicating with the network-connected cookie ledger to activate a smart contract associated with at least one cookie record of the one or more cookie records based on the cookie access token; and controlling one or more functions of the smart contract to communicate the cookie data between the cloud-based service and the network-connected cookie ledger, wherein the cookie access token expires upon termination of the communication session.

17. The method of claim 16, wherein the at least one cookie record of the one or more cookie records is associated with a ledger reference identifier provided by the cookie access token.

18. The method of claim 16, the method further comprising:

executing at least one decentralized application (DApp) based on the cookie access token to exchange the cookie data between the cloud-based service and the network-connected cookie ledger.

19. The method of claim 16, wherein the network-connected cookie ledger comprises at least one of:

a Hyperledger technology-based ledger;

a blockchain technology-based ledger;

a distributed ledger network (DLN)-based ledger; and a distributed ledger technology (DLT)-based ledger.

* * * * *